United States Patent
Yamamoto et al.

(10) Patent No.: US 10,504,484 B2
(45) Date of Patent: Dec. 10, 2019

(54) INFORMATION PROCESSING APPARATUS, INFORMATION RECORDING MEDIUM, IMAGE PROCESSING METHOD, AND PROGRAM FOR CONVERTING A COLOR SPACE OF AN IMAGE

(71) Applicant: Sony Corporation, Tokyo (JP)

(72) Inventors: Kazuo Yamamoto, Chiba (JP); Shinobu Hattori, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/127,922

(22) PCT Filed: Apr. 20, 2015

(86) PCT No.: PCT/JP2015/002152
§ 371 (c)(1),
(2) Date: Sep. 21, 2016

(87) PCT Pub. No.: WO2015/166644
PCT Pub. Date: Nov. 5, 2015

(65) Prior Publication Data
US 2017/0098427 A1 Apr. 6, 2017

(30) Foreign Application Priority Data
Apr. 30, 2014 (JP) ................. 2014-093500

(51) Int. Cl.
*G09G 5/06* (2006.01)
*H04N 11/24* (2006.01)
(Continued)

(52) U.S. Cl.
CPC ............... *G09G 5/06* (2013.01); *G09G 5/02* (2013.01); *G09G 5/026* (2013.01);
(Continued)

(58) Field of Classification Search
None
See application file for complete search history.

(56) References Cited

U.S. PATENT DOCUMENTS 5,912,710 A * 6/1999 Fujimoto ............. G09G 5/02
348/445
6,034,667 A * 3/2000 Barrett ................. G09G 5/02
345/603
(Continued)

FOREIGN PATENT DOCUMENTS

EP       1429557 A2    6/2004
JP       09298670 A * 11/1997
(Continued)

OTHER PUBLICATIONS

International Search Report for Application No. PCT/JP2015/002152 dated Jul. 30, 2015.
(Continued)

*Primary Examiner* — Ryan McCulley
(74) *Attorney, Agent, or Firm* — Lerner, David, Littenberg, Krumholz & Mentlik, LLP

(57) ABSTRACT

An information processing apparatus may include circuitry configured to: receive a first image (201), a second image (202) and first color space information (BT.2020) indicating a first color space of the first image; convert a second color space (BT.709) of the second image to a converted color space (BT.2020) same as the first color space, when the second color space is different from the first color space; and generate a display image (209) including the first image and the second image having the converted color space.

24 Claims, 15 Drawing Sheets

(51) Int. Cl.
*H04N 1/60* (2006.01)
*H04N 9/67* (2006.01)
*H04N 9/76* (2006.01)
*G09G 5/02* (2006.01)
*H04N 21/426* (2011.01)
*H04N 21/432* (2011.01)
*H04N 21/488* (2011.01)
*H04N 21/431* (2011.01)
*H04N 21/61* (2011.01)

(52) U.S. Cl.
CPC ............ *H04N 1/6072* (2013.01); *H04N 9/67* (2013.01); *H04N 9/76* (2013.01); *H04N 11/24* (2019.01); *G09G 2340/06* (2013.01); *G09G 2340/10* (2013.01); *G09G 2340/125* (2013.01); *H04N 21/42646* (2013.01); *H04N 21/42653* (2013.01); *H04N 21/4312* (2013.01); *H04N 21/4325* (2013.01); *H04N 21/4884* (2013.01); *H04N 21/6125* (2013.01); *H04N 2201/0089* (2013.01)

(56) References Cited

U.S. PATENT DOCUMENTS

| | | | | |
|---|---|---|---|---|
| 6,043,804 | A * | 3/2000 | Greene | G09G 5/02 345/589 |
| 2005/0099434 | A1* | 5/2005 | Gray, III | G06F 3/14 345/629 |
| 2009/0115901 | A1* | 5/2009 | Winter | H04N 5/262 348/565 |
| 2010/0157154 | A1* | 6/2010 | Kobayashi | G09G 5/02 348/557 |
| 2010/0259685 | A1 | 10/2010 | Isobe | |
| 2011/0304713 | A1* | 12/2011 | Tardif | G06F 3/1423 348/54 |
| 2012/0139973 | A1* | 6/2012 | Tsai | H04N 1/603 345/690 |

FOREIGN PATENT DOCUMENTS

| | | |
|---|---|---|
| JP | 2005130280 A | 5/2005 |
| JP | 2005292814 A | 10/2005 |
| JP | 2006086728 A | 3/2006 |
| JP | 2009038682 A | 2/2009 |
| JP | 2010263598 A | 11/2010 |
| JP | 2011130468 A | 6/2011 |
| WO | 2007009876 A1 | 1/2007 |

OTHER PUBLICATIONS

International Written Opinion for Application No. PCT/JP2015/002152 dated Jul. 30, 2015.
Chinese Office Action for Application No. CN201580021061.9 dated Jan. 19, 2018.
Japanese Office Action for Application No. JP2014093500 dated Dec. 5, 2017.
Examination Report including the Written Opinion for Application No. EP 15721353.9 dated Apr. 16, 2019.

* cited by examiner in# INFORMATION PROCESSING APPARATUS, INFORMATION RECORDING MEDIUM, IMAGE PROCESSING METHOD, AND PROGRAM FOR CONVERTING A COLOR SPACE OF AN IMAGE

CROSS-REFERENCE TO RELATED APPLICATION

This application is a national phase entry under 35 U.S.C. § 371 of International Application No. PCT/JP2015/002152 filed Apr. 20, 2015, published as WO 2015/166644 A1, which claims the benefit of Japanese Priority Patent Application JP 2014-093500 filed on Apr. 30, 2014, the entire contents of which are incorporated herein by reference.

TECHNICAL FIELD

The present disclosure relates to an information processing device, an information recording medium, an image processing method, and a program. In more detail, the present disclosure relates to an information processing device, an information recording medium, an image processing method, and a program that make it possible to display a plurality of images as images in a unified color space when conducting superposed display of the plurality of images.

BACKGROUND ART

As an information recording medium that record various contents such as movies, DVDs (Digital Versatile Discs) and BDs (Blu-ray (registered trademark) Discs) are mostly used.

An image, a voice, a caption, other graphic data and the like are recorded on each of the discs in a prescribed data recording format.

On the other hand, a display device, such as a television set, which displays images recorded on these discs, has been improved in resolution because of increase in the number of pixels in recent years.

For example, the television in the past has the number of pixels represented as the number of horizontal pixels × the number of vertical pixels=720 × 480. And the television in the past can display only SD (Standard Definition) images.

On the other hand, the Hi-vision television which is now widespread has the number of pixels represented as the number of horizontal pixels × the number of vertical pixels=1920 × 1080. And the Hi-vision television can display HD (High Definition) images (HD contents).

In addition, recently, the 4K television having four times the number of pixels in the HD image, i.e., having, for example, the number of horizontal pixels × the number of vertical pixels=4096 × 2160, and capable of displaying an image according to the so-called 4K standards (4K format) has been developed and now in a spreading stage.

The 4K television includes a display unit having the number of horizontal pixels × the number of vertical pixels=4096 × 2160, and is capable of displaying an image (4K image (4K contents) that is four times the HD image in resolution. In addition, a display device that displays an 8K image of a high resolution is also being studied.

As for contents having images of these resolutions, prescriptions in international standards (ITU) are provided with respect to a color space to be used. In other words, a color space corresponding to a color that can be output is prescribed.

As regards the SD image and the HD image, it is prescribed to make contents according to the following color space.

For the SD image, BT. 601, and
for the HD image, BT. 709.

In addition, as for the 4K image, it is demanded to support two color spaces: BT. 2020 and BT. 709. In other words, it is demanded to make contents capable of outputting colors corresponding to at least one of these two color spaces.

Note that, BT. 709 prescribes a color space having a wider color area as compared with BT. 601. In addition, BT. 2020 prescribes a wider color space as compared with BT. 709. The color space prescribed by BT. 2020 is nearly close to a color space observed by naked eyes, and output of natural colors with a higher precision is implemented.

Note that, display of contents having these color spaces is stated in, for example, PTL 1 (JP 2010-263598A) and the like.

CITATION LIST

Patent Literature

PTL 1: JP 2010-263598A

SUMMARY

Technical Problem

As for contents recorded on BDs, there are various contents such as HD images and 4K images mixedly under present conditions. As for color spaces of respective contents as well, therefore, three kinds differing in setting described above are present mixedly under the present conditions.

A problem is caused in a case where superposed display of images having color areas in different color spaces such as BT. 709 and BT. 2020 is conducted. If image contents in different color spaces are output mixedly in this way, a delicate color difference occurs even in a case where the same "red" is output, giving a sense of incongruity to viewers in some cases.

For example, it is supposed that a video such as a movie which is a main image is contents using the color space of BT. 2020, and contents displayed to be superposed on the video, for example, caption contents, or graphic contents, such as icons or animations, are contents using the color space of BT. 709. In this case, superposed display of these contents causes a problem that the viewers feel the lack of sense of uniformity of color and a sense of incongruity is generated.

The present disclosure has been made in view of, for example, such a problem. The present disclosure provides an information processing device, an information recording medium, an information processing method, and a program capable of generating and outputting an image that does not cause a sense of incongruity in viewers when conducting superposed display of image data corresponding to different color spaces.

Solution to Problem

According to an embodiment of the present disclosure, an information processing apparatus may include circuitry configured to: receive a first image, a second image and first color space information indicating a first color space of the first image; convert a second color space of the second image to a converted color space same as the first color space, when the second color space is different from the first color space; and generate a display image including the first image and the second image having the converted color space.

According to an embodiment of the present disclosure, an information recording medium may store first image data of a first image, first color space information indicating a first color space of the first image, and second image data of a second image; and the information recording medium may make it possible to cause a reproduction device configured to generate a display image including the first image and the second image having a converted color space, to convert a second color space of the second image to the converted color space same as the first color space, when the second color space is different from the first color space.

According to an embodiment of the present disclosure, an image processing method may include receiving a first image, a second image and first color space information indicating a first color space of the first image; converting a second color space of the second image to a converted color space same as the first color space, when the second color space is different from the first color space; and generating a display image including the first image and the second image having the converted color space.

According to an embodiment of the present disclosure, a non-transitory recording medium on which is recorded a program having instructions that, when executed by circuitry, may configure the circuitry to: receive a first image, a second image and first color space information indicating a first color space of the first image; convert a second color space of the second image to a converted color space same as the first color space, when the second color space is different from the first color space; and generate a display image including the first image and the second image having the converted color space.

Other features and advantages of the present disclosure will be clarified by more detailed description based on embodiments of the present disclosure described later and accompanying drawings. Note that, in the present specification, a system is a logical assembly configuration of a plurality of devices, and component devices are not necessarily housed in the same casing.

Advantageous Effects of Invention

According to the configuration of an embodiment of the present disclosure, a sense of incongruity in the case where image data in different color spaces are superposed and displayed is dissolved and display of superposed images in the unified color space is implemented. Specifically, the image processing unit acquires color space information of the main image and color space information of the sub-images to be superposed on the main image. In addition, in the case where the color space of a sub-image is different from the color space of the main image, the image processing unit executes color space conversion processing to cause the color space of the sub-image to coincide with the color space of the main image, and generates an image signal for superposition having the same color space as that of the main image. Then, the image processing unit superposes the generated image signal for superposition on the main image and outputs a resultant signal. The image processing unit executes, for example, color space conversion utilizing a look up table on an image signal including a palette entry id or an RGB signal. Owing to the present configuration, the sense of incongruity in the case where image data in different color spaces are superposed and displayed is dissolved, and superposed image display in the unified color space can be implemented.

Note that, the effects described in the present specification are exemplification to the last, and are not restrictive. There may be additional effects.

DESCRIPTION OF EMBODIMENTS

Figure 1:
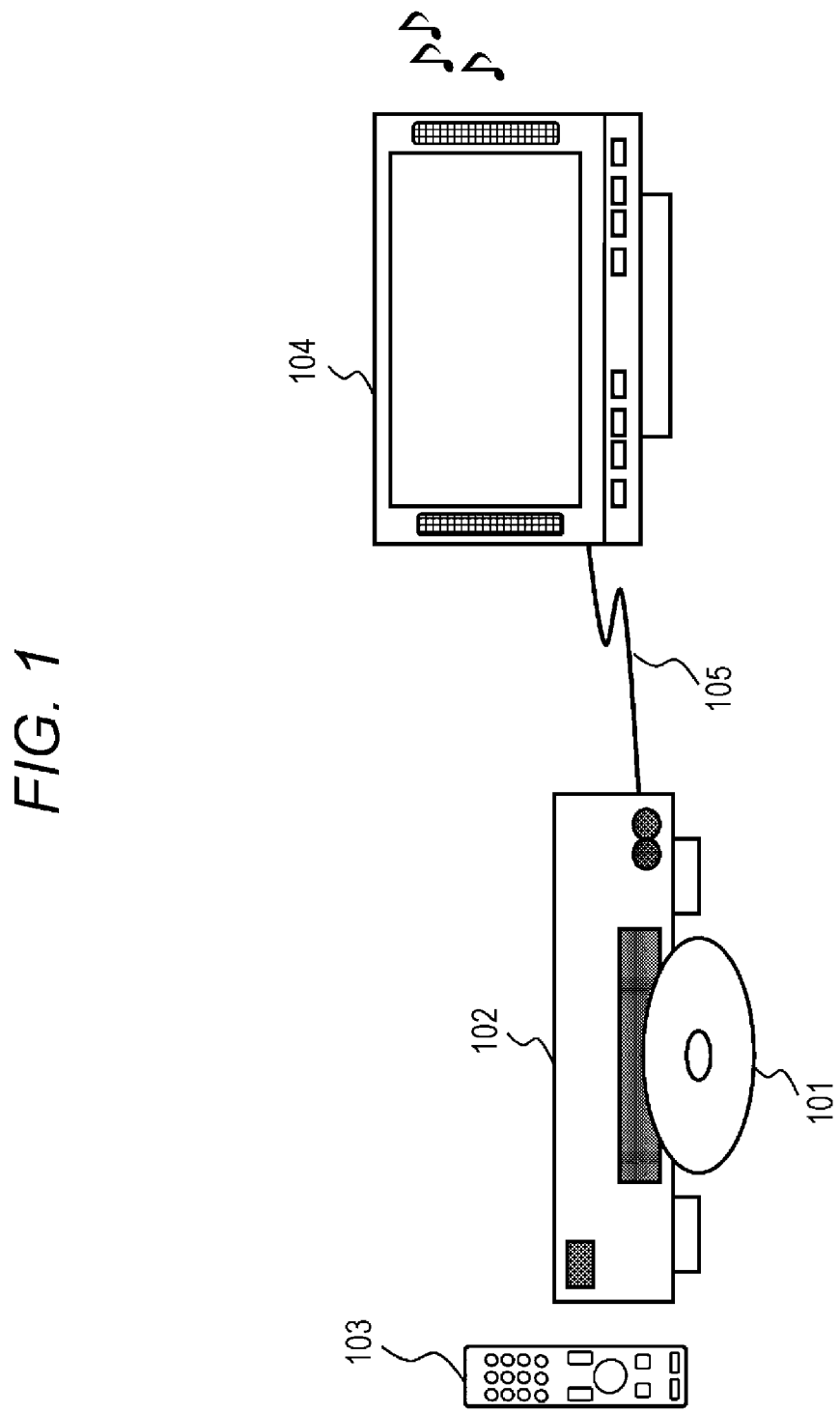
FIG. 1 is an explanation diagram of a utilization example of an information processing device.

Hereafter, details of an information processing device, an information recording medium, an image processing method, and a program according to the present disclosure will be described with reference to the drawings. Note that, description will be conducted in accordance with the following items.

1. Outline of contents reproduction processing
2. First embodiment of image processing according to the present disclosure
3. Second embodiment of image processing according to the present disclosure
4. Data stored on information recording medium and example of data reproduction processing
5. Reproduction example of superposed image data utilizing a plurality of data files
6. Storage area of color space information
7. Image that becomes reproduction processing target
8. Processing sequence executed by information processing device
9. Configuration example of information processing device
10. Summary of configuration according to present disclosure (1. Outline of Contents Reproduction Processing)

First, an outline of contents reproduction processing will now be described.

FIG. 1 is a diagram illustrating a configuration example of a contents reproduction processing system to which processing according to the present disclosure can be applied. In FIG. 1, an information recording medium 101 which is recording media that stores contents to be reproduced, an information processing device (reproduction device) 102 which executes reproduction processing of contents stored on the information recording medium 101, and a display device 104 which displays reproduced contents read out from the information recording medium 101 by the information processing device (reproduction device) 102 are illustrated.

In addition, an operation unit (remote controller) 103 which outputs operation information to the information processing device (reproduction device) 102, and a connection cable 105, such as, for example, HDMI (registered trademark) cable, which conducts data transmission between the information processing device (reproduction device) 102 and the display device 104 are illustrated.

In the example illustrated in FIG. 1, the information recording medium 101 which store contents is a BD (Blu-ray (registered trademark) Disc) and the information processing device (reproduction device) 102 is a BD player. However, a different combination of recording media and a reproduction device may also be used.

For example, the combination may include a flash memory as the information recording medium 101 which is the contents storage media and a memory reproduction device which executes data readout from the flash memory as the information processing device (reproduction device) 102.

Contents which become the reproduction target are recorded on the information recording medium 101. For example, the following image contents are included in the recorded contents.

(a) Video data such as a movie which becomes main=video image (b) Graphics data which can be displayed to be superposed on the video image=BD graphics (c) Java (registered trademark) graphics data which can be displayed to be superposed on the video image=BD-J graphics Note that, (b) BD graphics include data such as presentation graphics (PG) such as, for example, caption data having a bit map configuration, interactive graphics (IG) forming icons such as buttons for user operation, or text subtitle (TST) which is caption data generated by rendering processing of text fonts.

Furthermore, (c) BD-J graphics include image data of the Java (registered trademark) form.

The above-described (a), (b) and (c) are independent data. In other words, (a), (b) and (c) are data which can be generated individually and can be recorded on the information recording medium 101 individually. The data of (a), (b) and (c) are color image data, and are generated as color images according to respective specific color spaces.

As for color spaces of respective image data, there may be various settings. As an example, for example, there is the following setting.

(a) Video image=BT. 2020,
(b) BD graphics=BT. 709, and
(c) BD-J graphics=BT. 709.

Note that, as described earlier, BT. 2020, BT. 709 and the like are color spaces prescribed in the international standards (ITU). BT. 2020 prescribes a wider color space as compared with BT. 709. The color space prescribed by BT. 2020 is nearly close to a color space observed by naked eyes, and output of natural colors with higher precision is implemented.

If images having color areas in different color spaces, such as BT. 709 and BT. 2020, are mixedly displayed, however, a delicate color difference occurs even in a case where the same "red" is output, giving a sense of incongruity to viewers, as described earlier.

For example, if (a) the video image such as a movie which becomes the main is contents in the color space of BT. 2020 as described above and the above-described (b) BD graphics or (c) BD-J graphics having the color space of BT. 709 is displayed to be superposed on the video image, the sense of uniformity of color is hampered and the viewers feel a sense of incongruity.

Concrete problems in the case where the contents respectively of (a) to (c) are displayed to be superposed will now be described with reference to FIG. 2.

Figure 2:
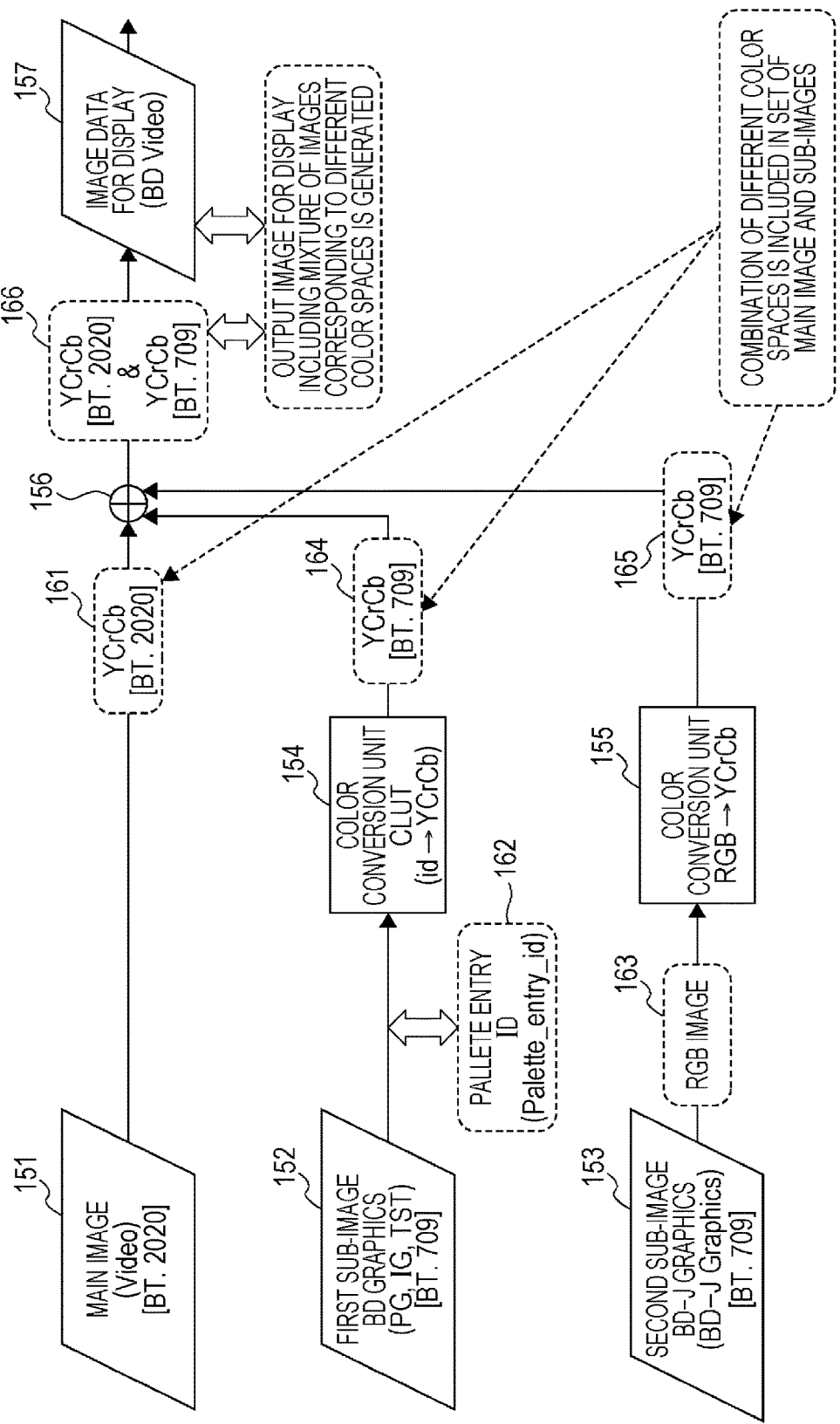
FIG. 2 is an explanation diagram of output image generation processing involving image superposition processing.

FIG. 2 illustrates a processing configuration example in a case where an image processing unit in the information processing device 102 reads out the following three images from the information recording medium 101, generates an image in which the three image data read out are superposed, and outputs the image to the display device.

(a) A main image 151 corresponding to a video image such as a movie, (b) a first sub-image 152 corresponding to BD graphics which forms a caption or the like, and (c) a second sub-image 153 corresponding to BD-J graphics having image data of a Java (registered trademark) form FIG. 2 is an explanation diagram of processing that generates a superposed image of these three images.

Note that, it is supposed that these three images are color image data having the following color spaces.

The main image 151 is image data having the color space BT. 2020, the first sub-image 152 is image data having the color space BT. 709, and the second sub-image 153 is image data having the color space BT. 709.

It is supposed that the above-described setting is done.

As illustrated in FIG. 2, the image processing unit in the information processing device 102 acquires an image signal: YCrCb [BT. 2020] 161 from the main image 151.

Note that, in the ensuing description, YCrCb [BT. 2020] denotes a YCrCb image signal having the color space BT.

2020 and YCrCb [BT. 709] denotes a YCrCb image signal having the color space BT. 709.

The first sub-image 152 is image data that holds color information corresponding to each pixel as, for example, a palette entry id corresponding to 256 colors. In the present example, the first sub-image 152 is image data in the color space BT. 709, and the palette entry id is also formed by an identifier that specifies a color prescribed by the color space BT. 709.

As illustrated in FIG. 2, the image processing unit in the information processing device 102 first acquires a palette entry id 162 from the first sub-image 152, and processing is conducted in a color conversion unit 154 to convert the palette entry id to an image signal YCrCb [BT. 709].

The color conversion unit 154 has a color conversion table having correspondence data between the palette entry id and the image signal YCrCb [BT. 709], i.e., a color lookup table (CLUT), and conducts processing of converting the palette entry id 162 to the image signal YCrCb [BT. 709] by using the color conversion table.

The color conversion unit 154 outputs an image signal YCrCb [BT. 709] 164 as converted data.

Furthermore, the second sub-image 153 is formed as a color image having, for example, an RGB image signal.

In the present example, the second sub-image 153 is image data of the color space BT. 709. The RGB image signal is also formed by an RGB signal value corresponding to a color prescribed by the color space BT. 709.

As illustrated in FIG. 2, the image processing unit in the information processing device 102 first acquires an RGB image signal 163 from the second sub-image 153, and processing is conducted in a color conversion unit 155 to convert the RGB image signal 163 to an image signal YCrCb [BT. 709].

The color conversion unit 155 executes, for example, previously prescribed arithmetic operations, applies each RGB signal value, and calculates a value of each YCrCb signal.

Note that, a value of each YCrCb signal calculated here is a YCrCb signal value corresponding to the color space BT. 709.

The color conversion unit 155 outputs an image signal YCrCb [BT. 709] 165 as converted data.

A superposition unit 156 executes superposition processing of the three image signals, and generates one output image.

In other words, the superposition unit 156 conducts superposition processing of the following three images.

(a) The image signal YCrCb [BT. 2020] 161 included in the main image 151, (b) the image signal YCrCb [BT. 709] included in the first sub-image 152 which is output by the color conversion unit 154, and (c) the image signal YCrCb [BT. 709] included in the second sub-image 153 which is output by the color conversion unit 155.

The superposition unit 156 conducts processing to superpose these three image signals. Note that, the superposition position is previously determined in accordance with a reproduction program.

A superposed image signal generated by the superposition unit 156 is an illustrated image signal: (YCrCb [BT. 2020] & YCrCb [BT. 709]) 166. In other words, an image including a mixture of an image area that conducts color output in accordance with the color space BT. 2020 and an image area that conducts color output in accordance with the color space BT. 709 is obtained.

This image is output to the display device 104 as image data for display (BD Video) 157, and displayed.

As a result, the display image in the display device 104 becomes an image including a mixture of an image area that conducts color output in accordance with the color space BT. 2020 and an image area that conducts color output in accordance with the color space BT. 709.

As a result, a problem that causes viewers to feel lack of the sense of uniformity of color is posed.

Note that, the example illustrated in FIG. 2 has the setting:

the main image 151 is image data in the color space BT. 2020, the first sub-image 152 is image data in the color space BT. 709, and the second sub-image 153 is image data in the color space BT. 709.

An output image area of the main image is output as image data in the color space BT. 2020, and output portions of the first sub-image 152 and the second sub-image 153 are output as image data in the color space BT. 709.

Combination patterns in a case where a plurality of images are combined and displayed are diverse. In a case of a combination in which the main image is an image according to the color space BT. 709 and the sub-images are images according to the color space BT. 2020, the output image also becomes an image that gives a sense of incongruity to viewers.

Figure 3:
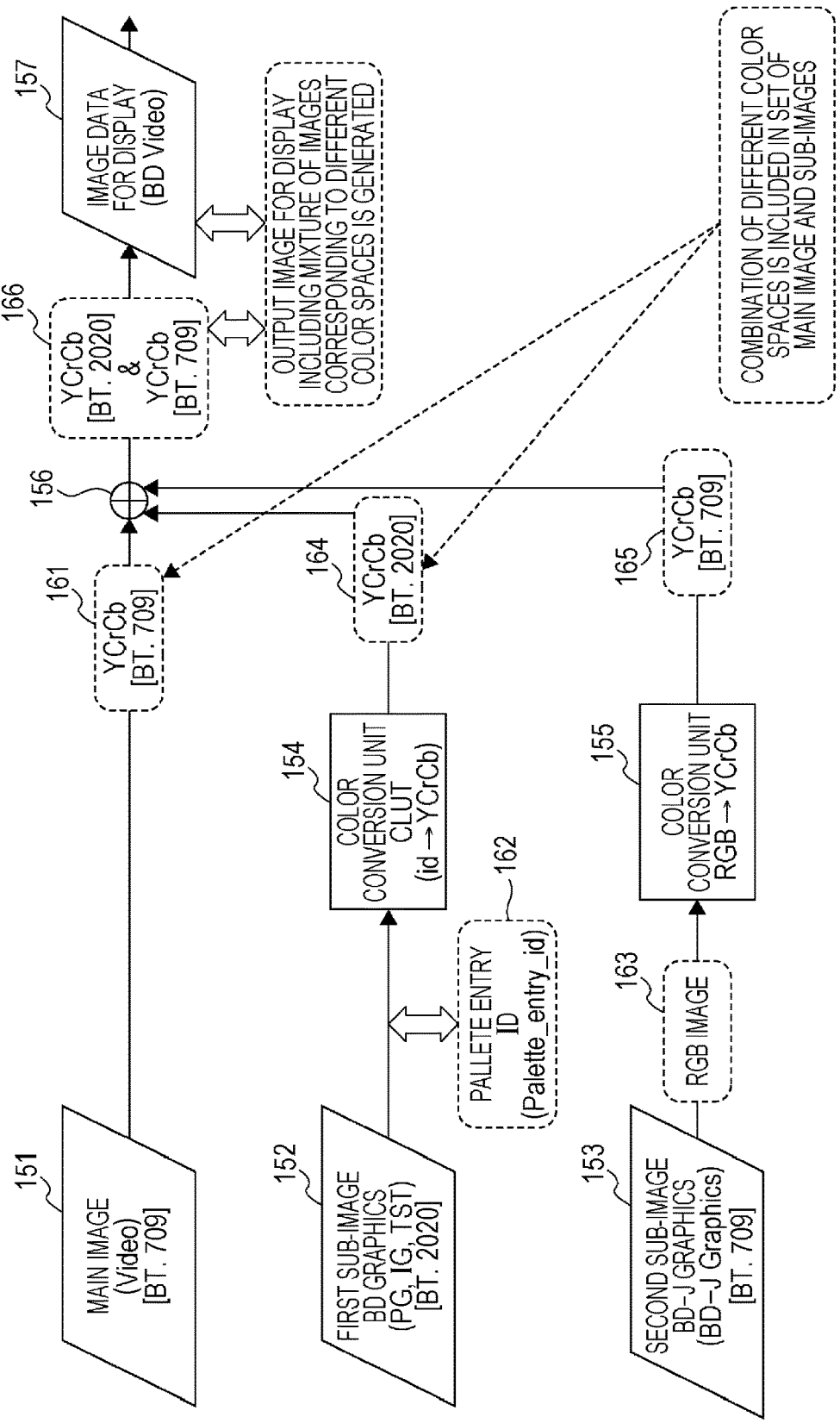
FIG. 3 is an explanation diagram of output image generation processing involving image superposition processing.

FIG. 3 illustrates an example of processing in a configuration having the following setting:

the main image 151 is image data in the color space BT. 709, the first sub-image 152 is image data in the color space BT. 2020, and the second sub-image 153 is image data in the color space BT. 709.

Processing conducted in each processing unit becomes processing similar to that described with reference to FIG. 2.

In the configuration illustrated in FIG. 3, an output image area of the main image is output as image data in the color space BT. 709, an output image area of the first sub-image 152 is output as image data in the color space BT. 2020, and an output portion of the second sub-image 153 is output as image data in the color space BT. 709.

In this case as well, pixel values corresponding to different color spaces are output every image area of output image. As a result, a sense of congruity is given to viewers.

(2. First Embodiment of Image Processing According to the Present Disclosure)

An example of processing executed by an information processing device according to the present disclosure which solves the problem described with reference to FIG. 2 and FIG. 3 will now be described.

Figure 4:
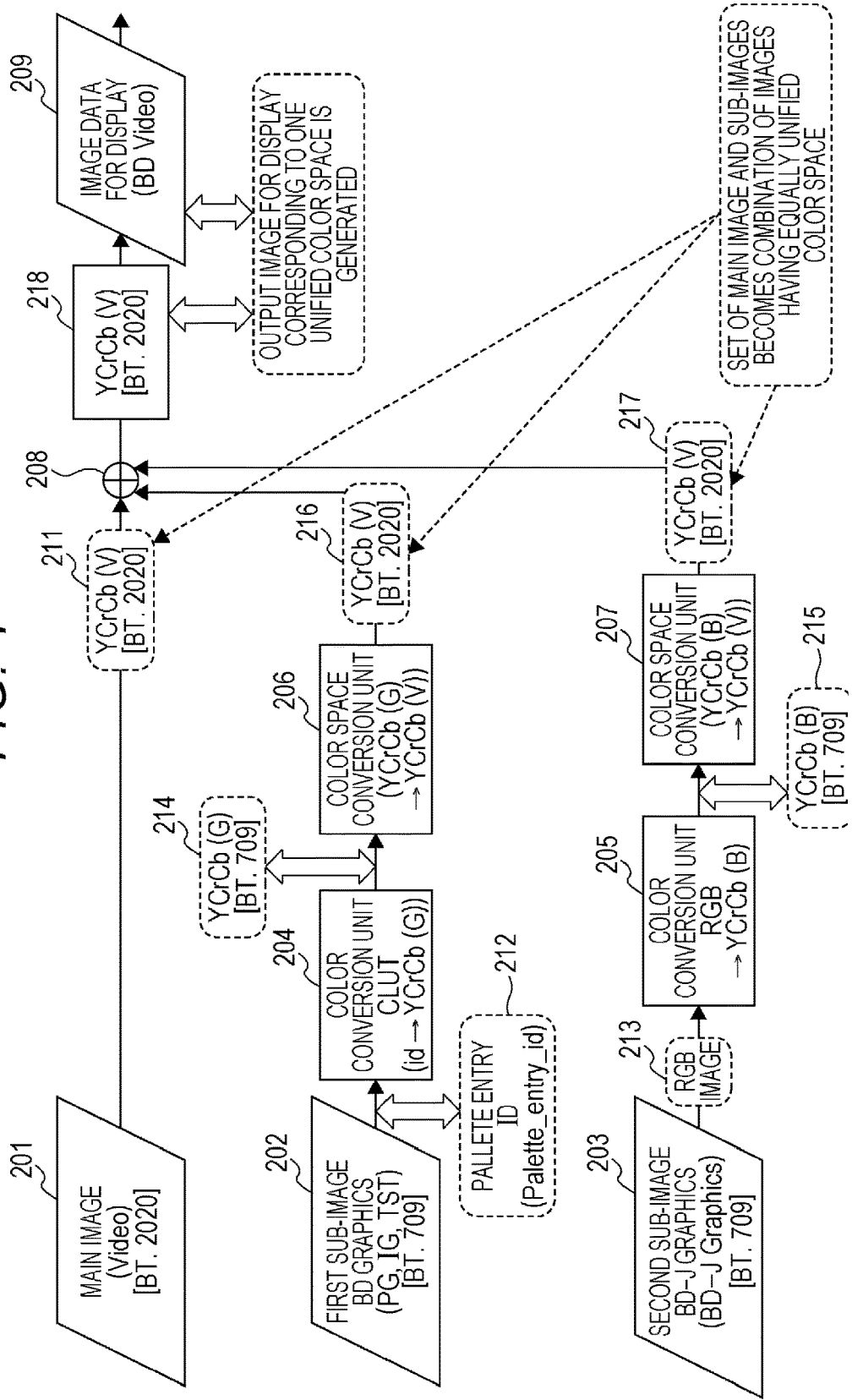
FIG. 4 is an explanation diagram of output image generation processing involving image superposition processing executed in accordance with a first embodiment of the present disclosure.

FIG. 4 illustrates a processing configuration example in a case where the image processing unit in the information processing device 102 reads out the following three images from the information recording medium 101, superposes three image data read out, and generates a display image, in the same way as FIG. 2 and FIG. 3 described earlier.

(a) A main image 201 corresponding to a video image such as a movie, (b) a first sub-image 202 corresponding to BD graphics which forms a caption or the like, and (c) a second sub-image 203 corresponding to BD-J graphics having image data of a Java (registered trademark) form FIG. 4 is an explanation diagram of processing conducted to superpose these three images.

It is supposed that these three images are color image data having the following color spaces in the same way as the description with reference to FIG. 2.

The main image 201 is image data having the color space BT. 2020, the first sub-image 202 is image data having the color space BT. 709, and the second sub-image 203 is image data having the color space BT. 709.

It is supposed that the above-described setting is done.

As illustrated in FIG. 4, the image processing unit in the information processing device 102 acquires an image signal: YCrCb [BT. 2020] 211 from the main image 201.

Note that, as described earlier, YCrCb [BT. 2020] denotes the YCrCb image signal having the color space BT. 2020, and YCrCb [BT. 709] denotes the YCrCb image signal having the color space BT. 709.

Note that, (V) in the YCrCb(V)[BT. 2020] 211 of FIG. 4 means that this image signal is an image signal having the same color space as the color space of the image data of the main image 201 (=V: Video).

Furthermore, YCrCb(G) means that this image signal is an image signal having the same color space as the color space of the image data of the first sub-image (=G: Graphics).

In the same way, YCrCb(B) means that this image signal is an image signal having the same color space as the color space of the image data of the second sub-image (=B: BD-J Graphics).

In the example illustrated in FIG. 4, YCrCb(V) is an image signal having the color space BT. 2020, and YCrCb (G) and YCrCb(B) are image signals having the color space BT. 709.

The first sub-image 202 is image data that holds color information corresponding to each pixel as a palette entry id corresponding to, for example, 256 colors.

As illustrated in FIG. 4, the image processing unit in the information processing device 102 first acquires a palette entry id 212 from the first sub-image 202, and the palette entry id 212 is converted in a color conversion unit 204 to an image signal YCrCb [BT. 709].

The color conversion unit 204 has a color conversion table having correspondence data between the palette entry id and the image signal YCrCb [BT. 709], i.e., a color lookup table (CLUT), and converts the palette entry id 212 to the image signal YCrCb [BT. 709] by using the color conversion table.

The color conversion unit 204 outputs an image signal YCrCb [BT. 709] 214 as converted data.

The image signal YCrCb [BT. 709] 214 which is output by the color conversion unit 204 is input to a color space conversion unit 206.

The color space conversion unit 206 executes processing of converting the image signal YCrCb [BT. 709] having the color space BT. 709 to an image signal YCrCb [BT. 2020] having the color space BT. 2020 which coincides with the color space of the main image 201.

Figure 5:
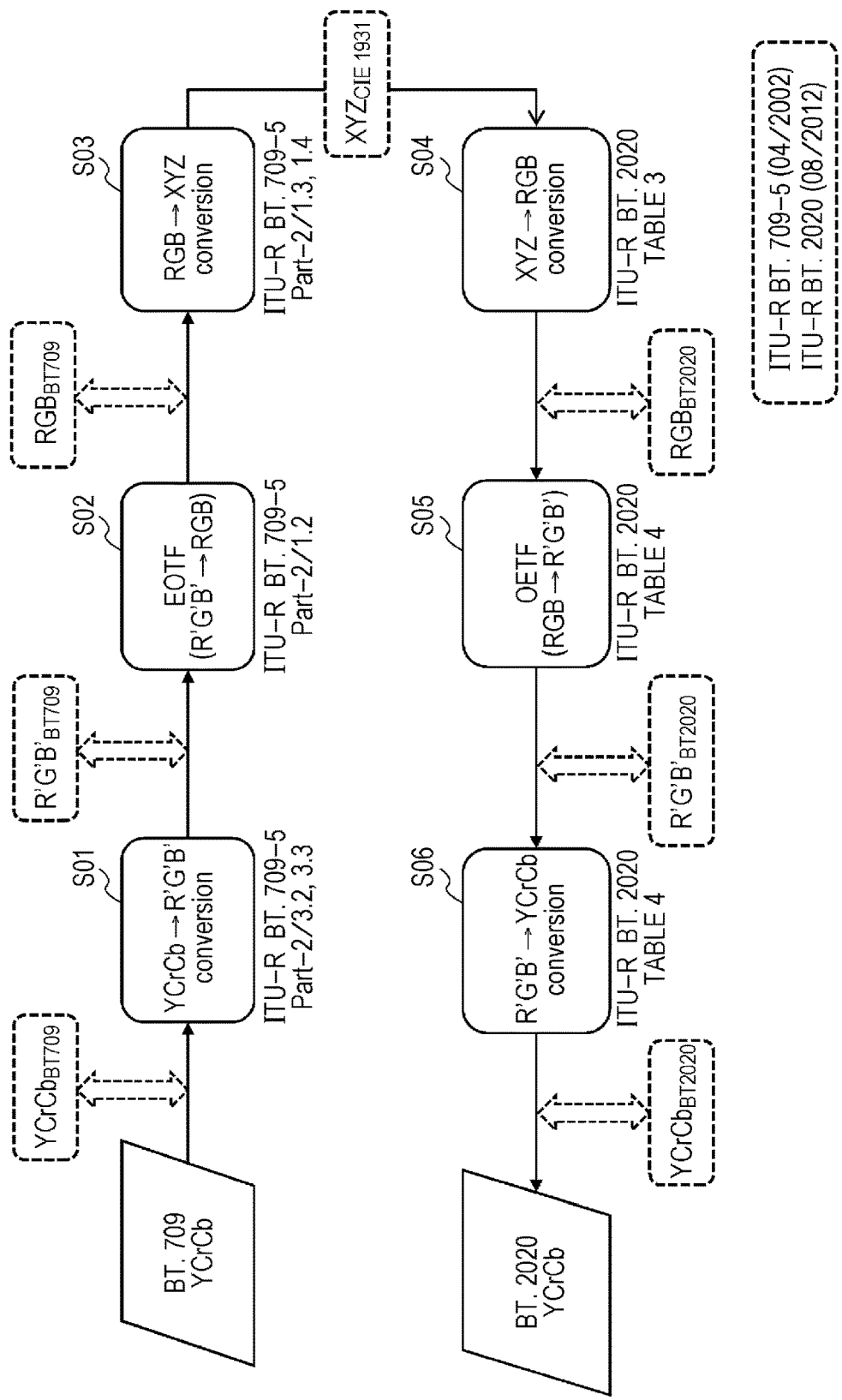
FIG. 5 is an explanation diagram of an example of color space conversion processing.

The processing of converting the image signal YCrCb [BT. 709] having the color space BT. 709 to the image signal YCrCb [BT. 2020] having the color space BT. 2020 is executed in accordance with, for example, a sequence illustrated in FIG. 5.

The color space conversion processing of an image signal illustrated in FIG. 5 is conversion processing according to specifications prescribed in international standards (ITU).

Conversion processing is conducted by executing steps S01 to S06 illustrated in FIG. 5 in order.

Processing conducted at each step is as follows.

(Step S01)

First, each YCrCb signal value in an image signal YCrCb [BT. 709] in the color space BT. 709 is converted to each R'G'B' signal value in the same color space BT. 709. This conversion processing can be executed in accordance with prescription in the international standards: ITU-R BT. 709-5 Part-2/3.2.3.3.

(Step S02)

Then, each R'G'B' signal value in the color space BT. 709 is converted to an RGB signal value in the same color space BT. 709. This is executed as processing with EOTF (Electro-Optical transfer function) applied. This conversion processing can be executed in accordance with prescription in the international standards: ITU-R BT. 709-5 Part-2/1.2.

(Step S03)

Then, each signal value in the image signal RGB in the color space BT. 709 is converted to each XYZ signal value. This conversion processing can be executed in accordance with prescription in the international standards: ITU-R BT. 709-5 Part-2/1.3.1.4.

Note that, the XYZ signal value is a color signal value according to the XYZ standard colorimetric system of device non-dependent type, and becomes a signal value which does not depend upon the color space such as BT. 709.

(Step S04)

Then, each signal value in the image signal XYZ according to the XYZ standard colorimetric system is converted to each RGB signal value in the color space BT. 2020.

The RGB signal value calculated here becomes an RGB value corresponding to the color space BT. 2020. This conversion processing can be executed in accordance with prescription in the international standards: ITU-R BT. 2020 TABLE 3.

(Step S05)

Then, each RGB signal value in the color space BT. 2020 is converted to an R'G'B' signal value in the same color space BT. 2020. This is executed as processing with OETF (Optical-Electro transfer function) applied. This conversion processing can be executed in accordance with prescription in the international standards: ITU-R BT. 2020 TABLE 4.

(Step S06)

Then, each R'G'B' signal value in the color space BT. 2020 is converted to a YCrCb signal value in the same color space BT. 2020. This conversion processing can be executed in accordance with prescription in the international standards: ITU-R BT. 2020 TABLE 4.

The image signal YCrCb [BT. 709] in the color space BT. 709 can be converted to the image signal YCrCb [BT. 2020] in the color space BT. 2020 by executing the above-described processing steps S01 to S06.

The color space conversion unit 206 illustrated in FIG. 4 converts the image signal YCrCb [BT. 709] in the color space BT. 709 to the image signal YCrCb [BT. 2020] in the color space BT. 2020 in accordance with, for example, the above-described processing.

Furthermore, the second sub-image 203 is formed as a color image having, for example, an RGB image signal.

As illustrated in FIG. 4, the image processing unit in the information processing device 102 first acquires an RGB image signal 213 from the second sub-image 203, and processing of converting the RGB image signal 213 to the image signal YCrCb [BT. 709] is conducted in a color conversion unit 205.

The color conversion unit 205 executes, for example, previously prescribed arithmetic operations, applies each RGB signal value, and calculates a value of each YCrCb signal.

Note that, a value of each YCrCb signal calculated here is a YCrCb signal value corresponding to the color space BT. 709.

The color conversion unit 205 outputs an image signal YCrCb [BT. 709] 215 as converted data.

The image signal YCrCb [BT. 709] 215 which is output by the color conversion unit 205 is input to a color space conversion unit 207.

The color space conversion unit 207 executes processing of converting the image signal YCrCb [BT. 709] in the color space BT. 709 to an image signal YCrCb [BT. 2020] in the color space BT. 2020 which coincides with the color space of the main image 201.

The color space conversion unit 207 executes processing of converting the image signal YCrCb [BT. 709] in the color space BT. 709 to the image signal YCrCb [BT. 2020] in the color space BT. 2020 in accordance with, for example, the sequence which executes processing at steps S01 to S06 illustrated in FIG. 5 in the same way as the color space conversion unit 206.

A superposition unit 208 executes superposition processing of three image signals and generates one output image. In other words, the superposition unit 208 conducts superposition processing of the following three images.

(a) The image signal YCrCb [BT. 2020] 211 included in the main image 201, (b) an image signal YCrCb [BT. 2020] 216 included in the first sub-image 202 which is output by the color space conversion unit 206, and (c) an image signal YCrCb [BT. 2020] 217 included in the second sub-image 203 which is output by the color space conversion unit 207.

The superposition unit 208 conducts processing of superposing these three image signals. Note that, the superposition position is previously determined in accordance with a reproduction program.

All of the three image signals which are input to the superposition unit 208 are image signals in the color space BT. 2020. As a result, a generated image signal YCrCb [BT. 2020] 218 becomes an image in which all image areas conduct color output according to the color space BT. 2020.

This image is output to the display device 104 as image data for display (BD Video) 209 and displayed.

As a result, as for the display image on the display device 104, all image areas become image areas where color output according to the color space BT. 2020 is conducted. An image in which color output is conducted in accordance with the unified color space is obtained. It becomes possible to provide an image which does not cause a sense of incongruity in viewers and which causes the viewers to feel a sense of uniformity of color.

Note that, the example described with reference to FIG. 4 is a processing example in a case where superposition display processing of images having the following setting is conducted.

The main image 201 is image data in the color space BT. 2020, the first sub-image 202 is image data in the color space BT. 709, and the second sub-image 203 is image data in the color space BT. 709.

The image processing unit in the information processing device 102 executes processing of converting image signals in the color space BT. 709 of the first sub-image 202 and the second sub-image 203 to match with the color space BT. 2020 of the main image 201.

It becomes possible to generate and output an image having a sense of uniformity by causing the color spaces of the sub-images to coincide with the color space of the main image 201 in this way.

However, combination patterns in the case where a plurality of images are combined and displayed are diversified. For example, there is also a case of combination in which the main image is an image according to the color space BT. 709 and the sub-images are images according to the color space BT. 2020.

Figure 6:
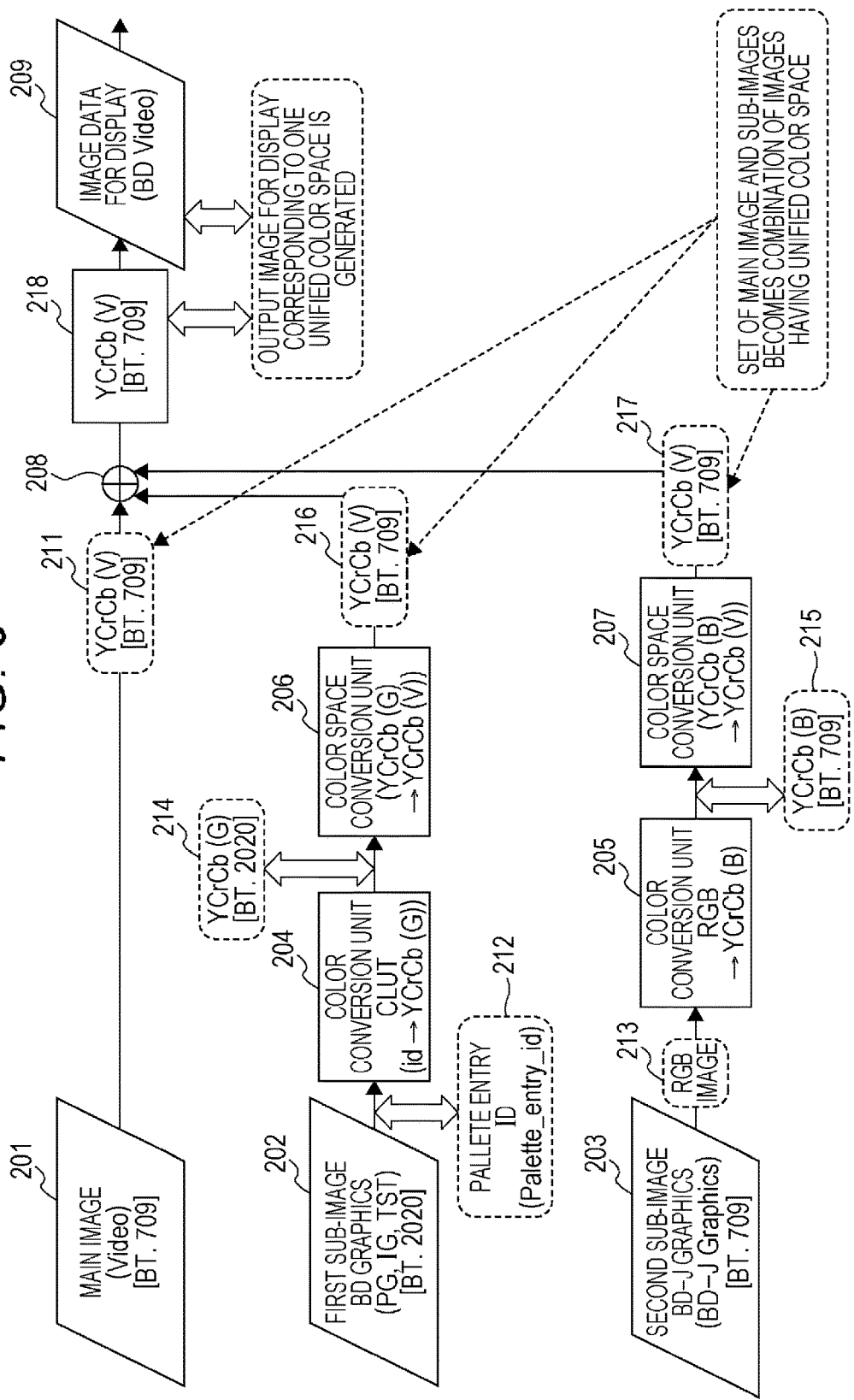
FIG. 6 is an explanation diagram of output image generation processing involving image superposition processing executed in accordance with the first embodiment of the present disclosure.

An example in FIG. 6 illustrates a processing example in a configuration having the following setting.

The main image 201 is image data in the color space BT. 709, the first sub-image 202 is image data in the color space BT. 2020, and the second sub-image 203 is image data in the color space BT. 709.

Processing conducted by the image processing unit in the information processing device 102 under the setting illustrated in FIG. 6 will now be described.

As illustrated in FIG. 6, the image processing unit in the information processing device 102 acquires the image signal: YCrCb [BT. 709] 211 from the main image 201.

The first sub-image 202 is formed as image data holding color information corresponding to each pixel as a palette entry id corresponding to, for example, 256 colors.

Note that, in the example illustrated in FIG. 6, the first sub-image 202 is image data in the color space BT. 2020, and color information corresponding to each pixel includes a palette entry id corresponding to the color space BT. 2020.

As illustrated in FIG. 6, the image processing unit in the information processing device 102 first acquires the palette entry id 212 from the first sub-image 202, and processing is conducted in the color conversion unit 204 to convert to an image signal YCrCb [BT. 2020].

The color conversion unit 204 has a color conversion table having correspondence data between the palette entry id and the image signal YCrCb [BT. 2020], i.e., a color lookup table (CLUT), and converts the palette entry id 212 to the image signal YCrCb [BT. 2020] by using the color conversion table.

The color conversion unit 204 outputs the image signal YCrCb [BT. 2020] 214 as converted data.

The image signal YCrCb [BT. 2020] 214 which is output by the color conversion unit 204 is input to the color space conversion unit 206.

The color space conversion unit 206 executes processing of causing the image signal YCrCb [BT. 2020] in the color space BT. 2020 to match with the color space BT. 709 corresponding to the image signal of the main image 201. In other words, the color space conversion unit 206 executes processing of converting the image signal YCrCb [BT. 2020] 214 which is output by the color conversion unit 204 to an image signal YCrCb [BT. 709] in the color space BT. 709.

The processing of converting the image signal YCrCb [BT. 2020] in the color space BT. 2020 to the image signal YCrCb [BT. 709] in the color space BT. 709 becomes processing of executing the sequence illustrated in FIG. 5 and described earlier inversely.

It is possible to convert the image signal YCrCb [BT. 2020] in the color space BT. 2020 to the image signal YCrCb

[BT. 709] in the color space BT. 709 by executing the processing illustrated in FIG. 5 inversely.

The color space conversion unit 206 illustrated in FIG. 6 converts the image signal YCrCb [BT. 2020] in the color space BT. 2020 to the image signal YCrCb [BT. 709] in the color space BT. 709 by, for example, executing the processing illustrated in FIG. 5 inversely.

Furthermore, the second sub-image 203 is formed as a color image having, for example, an RGB image signal.

Note that, in this example, the second sub-image 203 has an image signal in the color space BT. 709, and the RGB signal has a signal value corresponding to BT. 709.

As illustrated in FIG. 6, the image processing unit in the information processing device 102 first acquires the RGB image signal 213 from the second sub-image 203, and processing of converting the RGB image signal 213 to the image signal YCrCb [BT. 709] is conducted in the color conversion unit 205.

The color conversion unit 205 executes, for example, previously prescribed arithmetic operations, applies each RGB signal value, and calculates a value of each YCrCb signal.

Note that, a value of each YCrCb signal calculated here is a YCrCb signal value corresponding to the color space BT. 709.

The color conversion unit 205 outputs the image signal YCrCb [BT. 709] 215 as converted data.

The image signal YCrCb [BT. 709] 215 which is output by the color conversion unit 205 is input to the color space conversion unit 207. The color space conversion unit 207 executes processing of causing the image signal YCrCb [BT. 709] 215 which is output by the color conversion unit 205 to match with the color space BT. 709 corresponding to the image signal of the main image 201. In the present example, the image signal YCrCb [BT. 709] 215 which is output by the color conversion unit 205 coincides with the color space BT. 709 corresponding to the image signal of the main image 201. In this case, the color space conversion unit 207 outputs the input signal YCrCb [BT. 709] 215 as it is without conducting color space conversion processing.

The superposition unit 208 executes superposition processing of three image signals and generates one output image. In other words, the superposition unit 208 conducts superposition processing of the following three images.

(a) The image signal YCrCb [BT. 709] 211 included in the main image 201, (b) the image signal YCrCb [BT. 709] 216 included in the first sub-image 202 which is output by the color space conversion unit 206, and (c) the image signal YCrCb [BT. 709] 217 included in the second sub-image 203 which is output by the color space conversion unit 207.

The superposition unit 208 conducts processing of superposing these three image signals. Note that, the superposition position is previously determined in accordance with a reproduction program.

All of the three image signals which are input to the superposition unit 208 are image signals in the color space BT. 709. As a result, the generated image signal YCrCb [BT. 709] 218 becomes an image in which all image areas conduct color output according to the color space BT. 709.

This image is output to the display device 104 as the image data for display (BD Video) 209 and displayed.

As a result, as for the display image on the display device 104, all image areas become image areas where color output according to the color space BT. 709 is conducted. An image in which color output is conducted in accordance with the unified color space is obtained. It becomes possible to provide an image which does not cause a sense of incongruity in viewers and which causes the viewers to feel a sense of uniformity of color.

The image processing unit in the information processing device 102 conducts processing of changing color spaces of sub-images to be superposed, to cause the color spaces of the sub-images to match with the color space of the main image in this way.

Two concrete processing examples have been described with reference to FIG. 4 and FIG. 6. However, a processing example in a case of the following color space setting will now be described as a more generalized processing example with reference to FIG. 7.

Figure 7:
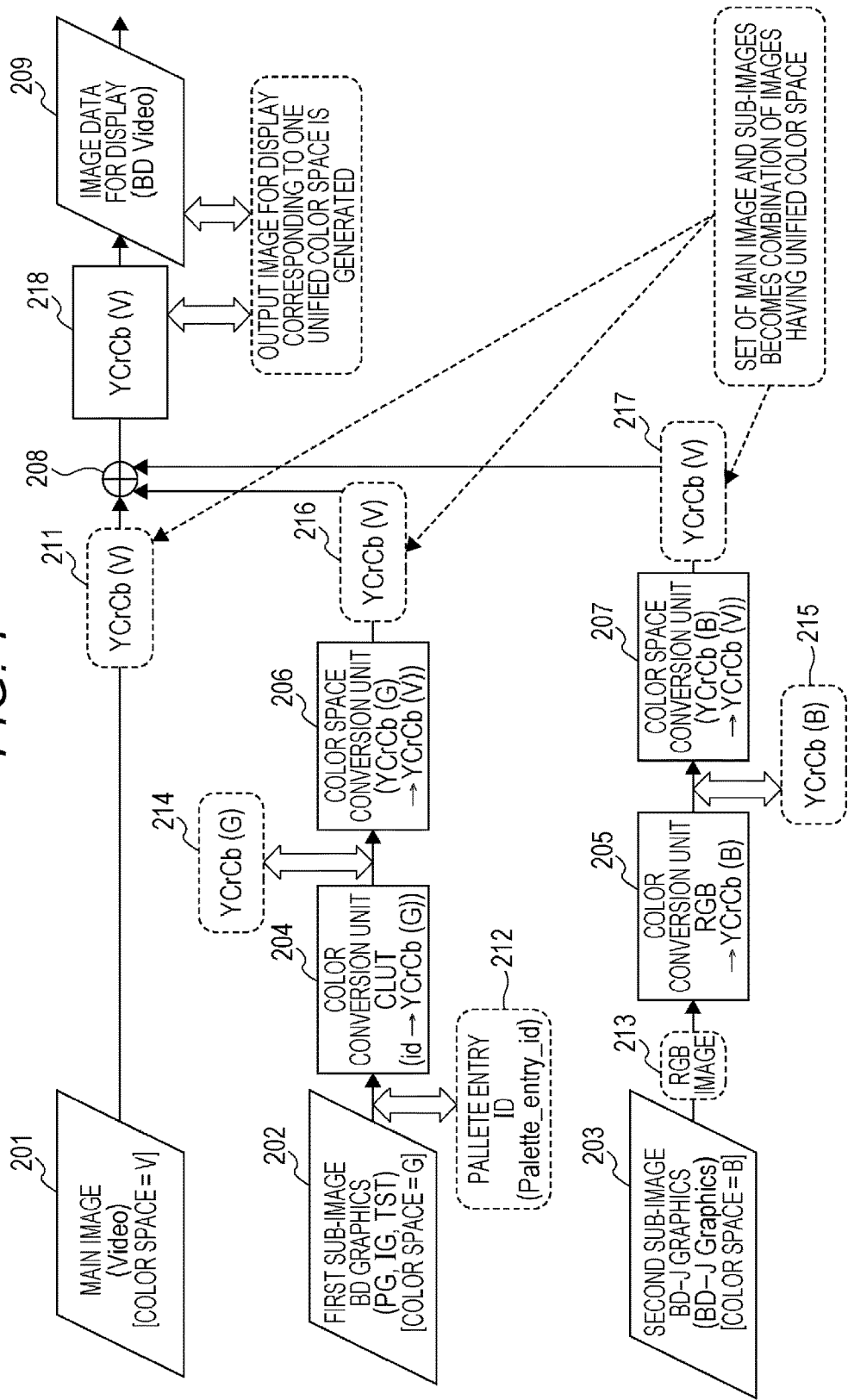
FIG. 7 is an explanation diagram of output image generation processing involving image superposition processing executed in accordance with the first embodiment of the present disclosure.

FIG. 7 illustrates a processing example in a configuration having the following setting.

The main image 201 is image data in a color space V, the first sub-image 202 is image data in a color space G, and the second sub-image 203 is image data in a color space B.

The color spaces V, G and B correspond to color spaces such as, for example, BT. 2020 and BT. 709.

In the configuration illustrated in FIG. 7, the color space conversion unit 206 which executes the color space conversion processing of the first sub-image 202 executes color space conversion processing to cause the color space G of the first sub-image 202 to coincide with the color space V of the main image 201.

In other words, the color space conversion unit 206 converts an image signal YCrCb(G) of the first sub-image 202 to an image signal YCrCb(V).

Furthermore, the color space conversion unit 207 which executes the color space conversion processing of the second sub-image 203 executes color space conversion processing to cause the color space B of the second sub-image 203 to coincide with the color space V of the main image 201.

In other words, the color space conversion unit 207 converts an image signal YCrCb(B) of the second sub-image 203 to an image signal YCrCb(V).

The superposition unit 208 executes superposition processing of three image signals and generates one output image. In other words, the superposition unit 208 conducts superposition processing of the following three images.

(a) The image signal YCrCb(V) 211 included in the main image 201, (b) the image signal YCrCb(V) 216 included in the first sub-image 202 which is output by the color space conversion unit 206, and (c) the image signal YCrCb(V) 217 included in the second sub-image 203 which is output by the color space conversion unit 207.

The superposition unit 208 conducts processing of superposing these three image signals. Note that, the superposition position is previously determined in accordance with a reproduction program.

All of the three image signals which are input to the superposition unit 208 are image signals in the same color space V as the color space V of the main image 201. As a result, a generated image signal YCrCb(V) 218 becomes an image in which all image areas conduct color output according to the same color space V.

This image is output to the display device 104 as image data for display (BD Video) 209 and displayed.

As a result, as for the display image on the display device 104, all image areas become image areas where color output according to the color space V unified to the color space V of the original main image 201 is conducted. It becomes possible to output an image which does not cause a sense of incongruity in viewers and which causes the viewers to feel a sense of uniformity of color.

(3. Second Embodiment of Image Processing According to the Present Disclosure)

A second embodiment of the present disclosure will now be described with reference to FIG. 8 and following diagrams.

Figure 8:
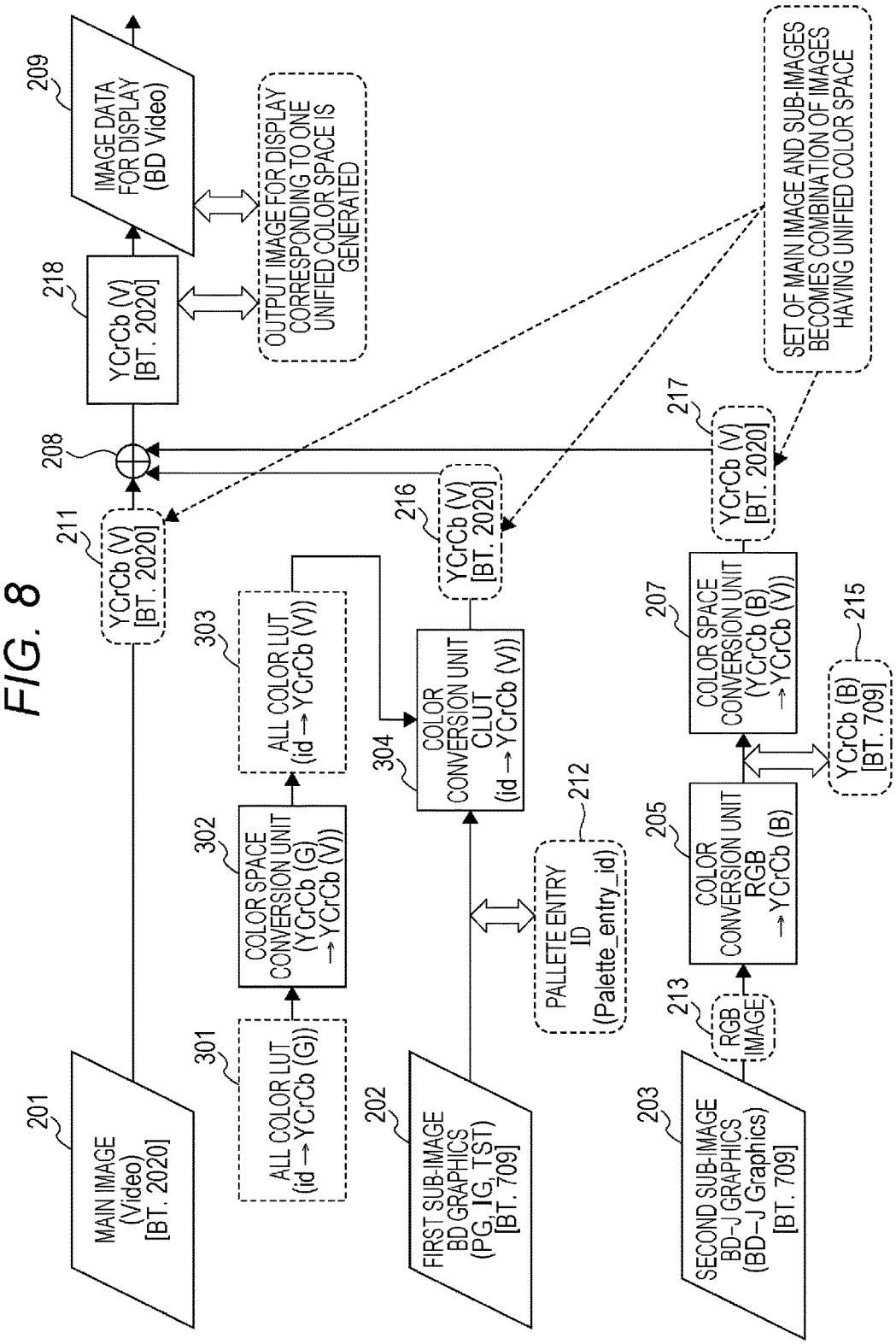
FIG. 8 is an explanation diagram of output image generation processing involving image superposition processing executed in accordance with a second embodiment of the present disclosure.

FIG. 8 illustrates a processing example in a case where the image processing unit in the information processing device 102 reads out the following three images from the information recording medium 101, superposes three image data read out, and generates a display image, in the same way as FIG. 4 described earlier.

(a) The main image 201 in color space BT. 2020 corresponding to a video image such as a movie,
(b) the first sub-image 202 in color space BT. 709 corresponding to BD graphics which forms a caption or the like, and
(c) the second sub-image 203 in color space BT. 709 corresponding to BD-J graphics having image data of a Java (registered trademark) form FIG. 8 is an explanation diagram of processing conducted to superpose these three images.

In the second embodiment, only processing on the first sub-image 202 including the palette entry id becomes processing different from that in the first embodiment. In other words, an all color LUT 301, a color space conversion unit 302, an all color LUT 303, and a color conversion unit 304 illustrated in FIG. 8 conduct processing peculiar to the present embodiment.

Processing conducted in other configuration units is the same as that in the first embodiment.

As illustrated in FIG. 8, the image processing unit in the information processing device 102 acquires an image signal: YCrCb [BT. 2020] 211 from the main image 201.

Note that, as described earlier, YCrCb [BT. 2020] denotes the YCrCb image signal having the color space BT. 2020, and YCrCb [BT. 709] denotes the YCrCb image signal having the color space BT. 709.

The first sub-image 202 is image data that holds color information corresponding to each pixel as a palette entry id corresponding to, for example, 256 colors.

In the second embodiment, the image processing unit in the information processing device 102 acquires a palette entry id 212 from the first sub-image 202 as illustrated in FIG. 8, and processing of converting the palette entry id 212 to an image signal YCrCb [BT. 2020] is conducted in the color conversion unit 304.

In the example illustrated in FIG. 8, the first sub-image 202 is an image signal in the color space BT. 709, and the palette entry id 212 is also an identifier corresponding to a color which is set according to the color space BT. 709.

The palette entry id 212 in the color space BT. 709 is input to the color conversion unit 304. The color conversion unit 304 conducts processing of converting the palette entry id 212 to an image signal YCrCb [BT. 2020] in a different color space BT. 2020.

In the present embodiment, the color conversion unit 304 has a color conversion table having correspondence data between the palette entry id corresponding to the color space BT. 709 and the image signal YCrCb [BT. 2020] in the color space BT. 2020, i.e., a color lookup table (CLUT).

The color conversion unit 304 conducts processing of converting the palette entry id 212 corresponding to the color space BT. 709 to the image signal YCrCb [BT. 2020] corresponding to the color space BT. 2020 by using the color conversion table.

A configuration used to generate the look up table applied to the conversion processing is the all color LUT 301, the color space conversion unit 302, and the all color LUT 303.

The all color LUT 301 is a look up table used to convert a palette entry id corresponding to the color space BT. 709 to an image signal YCrCb [BT. 709] in the color space BT. 709. The all color LUT 301 is a look up table (LUT) having correspondence data between all elements (all id's) in a palette corresponding to the color space BT. 709 and the image signal YCrCb [BT. 709] in the color space BT. 709.

The all color LUT 301 is input to the color space conversion unit 302. The color space conversion unit 302 executes processing of rewriting a value of the image signal YCrCb [BT. 709] in the color space BT. 709 corresponding to each entry id in the look up table to a signal value corresponding to the color space (in the present example, BT. 2020) of the main image 201, i.e., YCrCb [BT. 2020].

The color space conversion unit 302 outputs the all color LUT 303 generated as a result of the table rewriting to the color conversion unit 304.

The all color LUT 303 is a look up table used to convert a palette entry id corresponding to the color space BT. 709 to an image signal YCrCb [BT. 2020] in the color space BT. 2020.

The color conversion unit 304 applies the all color LUT 303, and conducts processing of converting the palette entry id 212 in the color space BT. 709 included in the first sub-image 202 to an image signal YCrCb [BT. 2020] in the color space BT. 2020.

The color conversion unit 304 outputs the image signal YCrCb [BT. 2020] 216 in the color space BT. 2020, which is converted data generated by applying the all color LUT 303.

Furthermore, the second sub-image 203 is formed as a color image having, for example, an RGB image signal.

As illustrated in FIG. 8, the image processing unit in the information processing device 102 first acquires an RGB image signal 213 from the second sub-image 203, and processing of converting the RGB image signal 213 to the image signal YCrCb [BT. 709] is conducted in the color conversion unit 205.

The color conversion unit 205 executes, for example, previously prescribed arithmetic operations, applies each RGB signal value, and calculates a value of each YCrCb signal.

Note that, a value of each YCrCb signal calculated here is a YCrCb signal value corresponding to the color space BT. 709.

The color conversion unit 205 outputs the image signal YCrCb [BT. 709] 215 as converted data.

The image signal YCrCb [BT. 709] 215 which is output by the color conversion unit 205 is input to the color space conversion unit 207.

The color space conversion unit 207 executes processing of converting the image signal YCrCb [BT. 709] in the color space BT. 709 to an image signal YCrCb [BT. 2020] in the color space BT. 2020 which is a different color space.

The color space conversion unit 207 executes processing of converting the image signal YCrCb [BT. 709] in the color space BT. 709 to the image signal YCrCb [BT. 2020] in the color space BT. 2020 in accordance with, for example, the sequence which executes processing at steps S01 to S06 illustrated in FIG. 5.

The superposition unit 208 executes superposition processing of three image signals and generates one output image. In other words, the superposition unit 208 conducts superposition processing of the following three images.

(a) The image signal YCrCb [BT. 2020] 211 included in the main image 201, (b) the image signal YCrCb [BT. 2020] 216 included in the first sub-image 202 which is output by the color conversion unit 304, and (c) the image signal YCrCb [BT. 2020] 217 included in the second sub-image 203 which is output by the color space conversion unit 207.

The superposition unit 208 executes superposition processing of these three image signals. Note that, the superposition position is previously determined in accordance with a reproduction program.

All of the three image signals which are input to the superposition unit 208 are image signals in the color space BT. 2020. As a result, a generated image signal YCrCb [BT. 2020] 218 becomes an image in which all image areas conduct color output according to the color space BT. 2020.

This image is output to the display device 104 as image data for display (BD Video) 209 and displayed.

As a result, as for the display image on the display device 104, all image areas become image areas according to the color space BT. 2020. In other words, color output is conducted in accordance with the unified color space. It becomes possible to output an image of high quality which does not cause a sense of incongruity in viewers.

In this way, the present embodiment has a configuration in which color conversion of the first sub-image 202 is executed by utilizing a color look up table (CLUT) which makes it possible to convert the palette entry id 212 set as color information of the first sub-image 202 directly to an image signal in the same color space as that of the main image 201.

One concrete processing example has been described with reference to FIG. 8. However, a processing example in a case of the following color space setting will now be described as a more generalized processing example with reference to FIG. 9.

Figure 9:
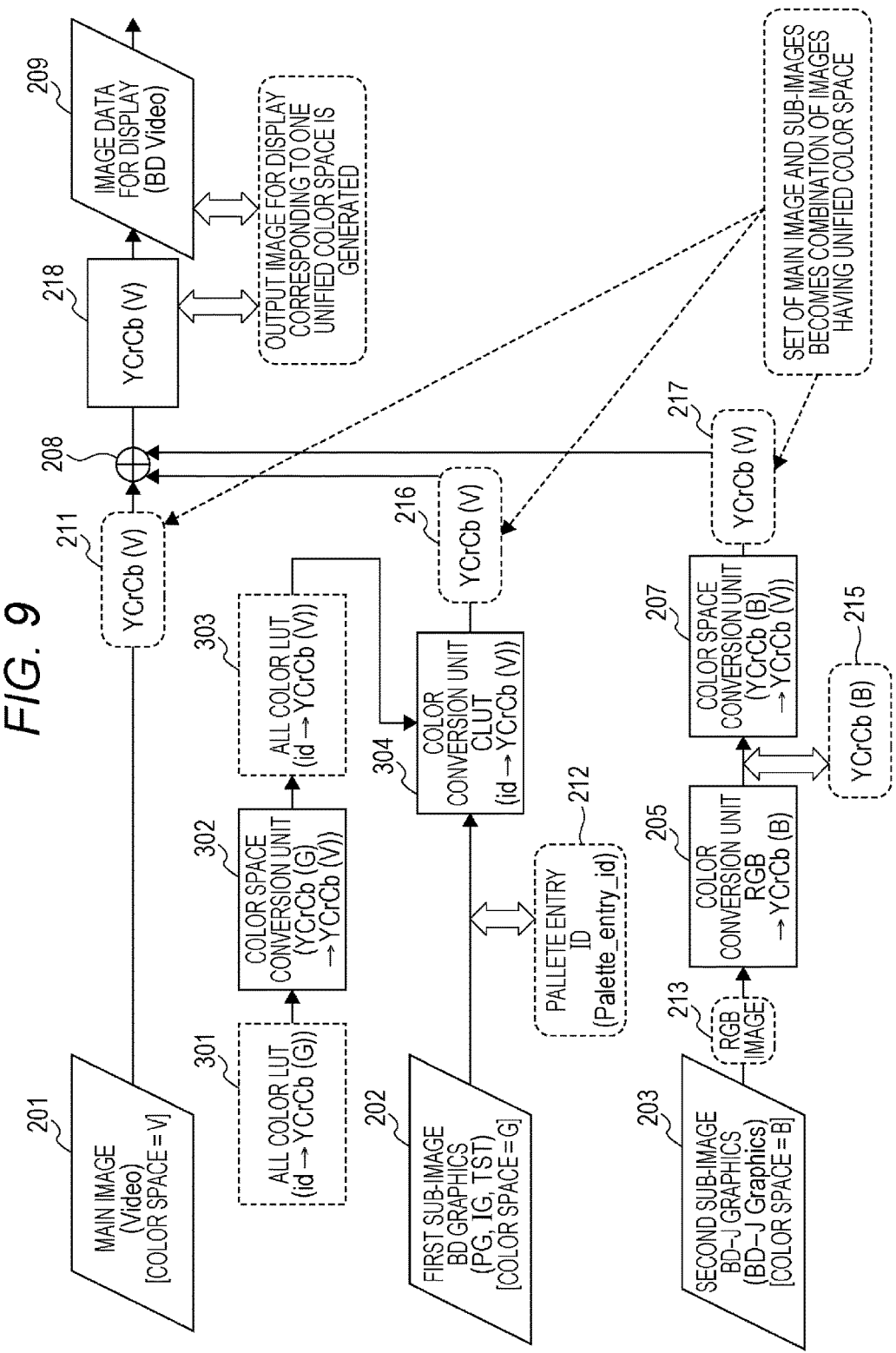
FIG. 9 is an explanation diagram of output image generation processing involving image superposition processing executed in accordance with the second embodiment of the present disclosure.

FIG. 9 illustrates a processing example in a configuration having the following setting.

The main image 201 is image data in the color space V, the first sub-image 202 is image data in the color space G, and the second sub-image 203 is image data in the color space B.

In the configuration illustrated in FIG. 9, the color conversion unit 304, which conducts color conversion of the first sub-image 202, conducts processing of acquiring the palette entry id 212 according to the color space G from the first sub-image 202 and converting the palette entry id 212 to an image signal YCrCb(V) corresponding to the color space V of the main image 201.

In the example illustrated in FIG. 9, the first sub-image 202 is an image signal in the color space G. The palette entry id 212 is also an identifier corresponding to a color which is set according to the color space G.

The palette entry id 212 in the color space G is input to the color conversion unit 304. The color conversion unit 304 conducts processing of converting the palette entry id 212 to an image signal YCrCb(V) in a different color space V.

The color conversion unit 304 has a color conversion table having correspondence data between the palette entry id corresponding to the color space G and the image signal YCrCb(V) in the color space V, i.e., a color lookup table (CLUT).

A configuration used to generate the look up table is the all color LUT 301, the color space conversion unit 302, and the all color LUT 303.

The all color LUT 301 is a look up table used to convert a palette entry id corresponding to the color space G to an image signal YCrCb(G) in the color space G. The all color LUT 301 is a look up table (LUT) having correspondence data between all elements (all id's) in a palette corresponding to the color space G and the image signal YCrCb(G) in the color space G.

The all color LUT 301 is input to the color space conversion unit 302. The color space conversion unit 302 executes processing of rewriting a value of the image signal YCrCb(G) in the color space G corresponding to each entry id in the look up table to a signal value corresponding to the color space V of the main image 201, i.e., YCrCb(V).

The color space conversion unit 302 outputs the all color LUT 303 generated as a result of the table rewriting to the color conversion unit 304.

The all color LUT 303 is a look up table used to convert a palette entry id corresponding to the color space G to an image signal YCrCb(V) in the color space V.

The color conversion unit 304 applies the all color LUT 303, and converts the palette entry id 212 in the color space G included in the first sub-image 202 to an image signal YCrCb(V) in the color space V.

The color conversion unit 304 outputs the image signal YCrCb(V) 216 in the color space V, which is converted data generated by applying the all color LUT 303.

Furthermore, the second sub-image 203 is formed as a color image having an RGB image signal corresponding to the color space B.

As illustrated in FIG. 9, the image processing unit in the information processing device 102 first acquires an RGB image signal 213 from the second sub-image 203, and processing of converting the RGB image signal 213 to the image signal YCrCb(B) is conducted in the color conversion unit 205.

The color conversion unit 205 outputs the image signal YCrCb(B) 215 as converted data.

The image signal YCrCb(B) 215 which is output by the color conversion unit 205 is input to the color space conversion unit 207.

The color space conversion unit 207 executes processing of converting the image signal YCrCb(B) in the color space B to an image signal YCrCb(V) in the color space V which coincides with the color space V of the main image 201.

The color space conversion unit 207 executes processing of converting the image signal YCrCb(B) in the color space B to the image signal YCrCb(V) in the color space V which coincides with the color space V of the main image 201 in accordance with, for example, the sequence which executes processing at steps S01 to S06 illustrated in FIG. 5.

The superposition unit 208 executes superposition processing of three image signals and generates one output image. In other words, the superposition unit 208 conducts superposition processing of the following three images.

(a) The image signal YCrCb(V) 211 included in the main image 201, (b) the image signal YCrCb(V) 216 included in the first sub-image 202 which is output by the color conversion unit 304, and (c) the image signal YCrCb(V) 217 included in the second sub-image 203 which is output by the color space conversion unit 207.

The superposition unit 208 executes superposition processing of these three image signals. Note that, the superposition position is previously determined in accordance with a reproduction program.

All of the three image signals which are input to the superposition unit 208 are image signals in the color space V which is the same as the color space V of the original main image 201. As a result, a generated image signal YCrCb(V) 218 becomes an image in which all image areas conduct color output according to the color space V.

This image is output to the display device 104 as image data for display (BD Video) 209 and displayed.

As a result, as for the display image on the display device 104, all image areas become image areas where color output according to the color space V is conducted, and color output is conducted in accordance with the unified color space. As a result, it becomes possible to output an image which does not cause a sense of incongruity in viewers and which causes the viewers to feel a sense of uniformity of color.

In this way, the present embodiment has a configuration in which color conversion is executed by utilizing a color look up table (CLUT) to convert the palette entry id 212 set as color information of the first sub-image 202 directly to an image signal in the same color space as that of the main image 201.

(4. Data Stored on Information Recording Medium and Example of Data Reproduction Processing)

A configuration example and a reproduction processing example of an information recording medium which stores reproduction target data, i.e., the information recording medium 101 illustrated in FIG. 1 will now be described.

Figure 10:
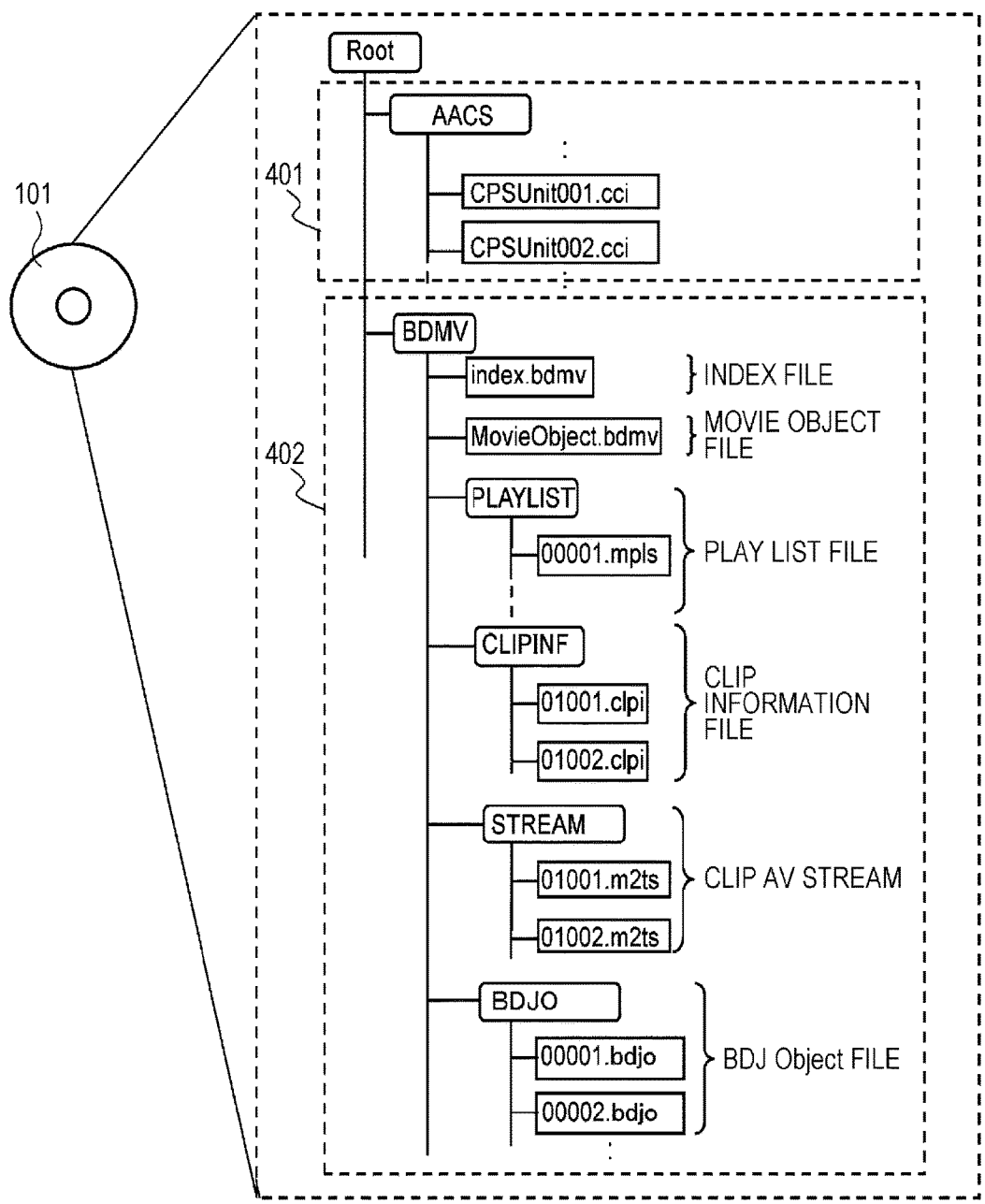
FIG. 10 is an explanation diagram of a configuration example of data stored in a BD-ROM.

FIG. 10 is a diagram illustrating a directory of recorded data according to the BDMV format recorded on a ROM type BD (Blu-ray (registered trademark) Disc) which is an example of the information recording medium 101.

As illustrated in FIG. 10, the directory is separated into a management information setting unit 401 (AACS directory) and a data unit 402 (BDMV directory).

A CPS unit key file, which is an encryption key of data, a utilization control information file, and the like are stored in the management information setting unit 401 (AACS directory).

On the other hand, files such as, for example,
an index file,
a play list file,
a clip information file,
a clip AV stream file, and
a BDJO file
are recorded following the BDMV directory in the data unit 402.

Title information functioning as index information applied to reproduction processing is stored in the index file.

The play list file is a file prescribing a reproduction order and the like of contents according to program information of a reproduction program specified by a title, and has specifying information for clip information having reproduction position information.

The clip information file is a file specified by the play list file, and has reproduction position information and the like of the clip AV stream file.

The clip AV stream file is a file that stores AV stream data which becomes a target of reproduction.

The BDJO file is a file that stores execution control information for a file that stores a JAVA (registered trademark) program, commands and the like.

Reproduction processing of the above-described BD-J graphics is conducted by utilizing a reproduction program in the BDJO file and reproduction data.

A sequence in which the information processing device reproduces contents recorded on the information recording medium is as follows.

(a) First, a reproduction application specifies a specific title from the index file.

(b) A reproduction program associated with the specified title is selected.

(c) A play list which prescribes the reproduction order of contents and the like is selected in accordance with program information of the selected reproduction program.

(d) An AV stream or a command is read out as contents actual data on the basis of clip information prescribed in the selected play list, and reproduction of the AV stream and execution processing of the command are conducted.

Figure 11:
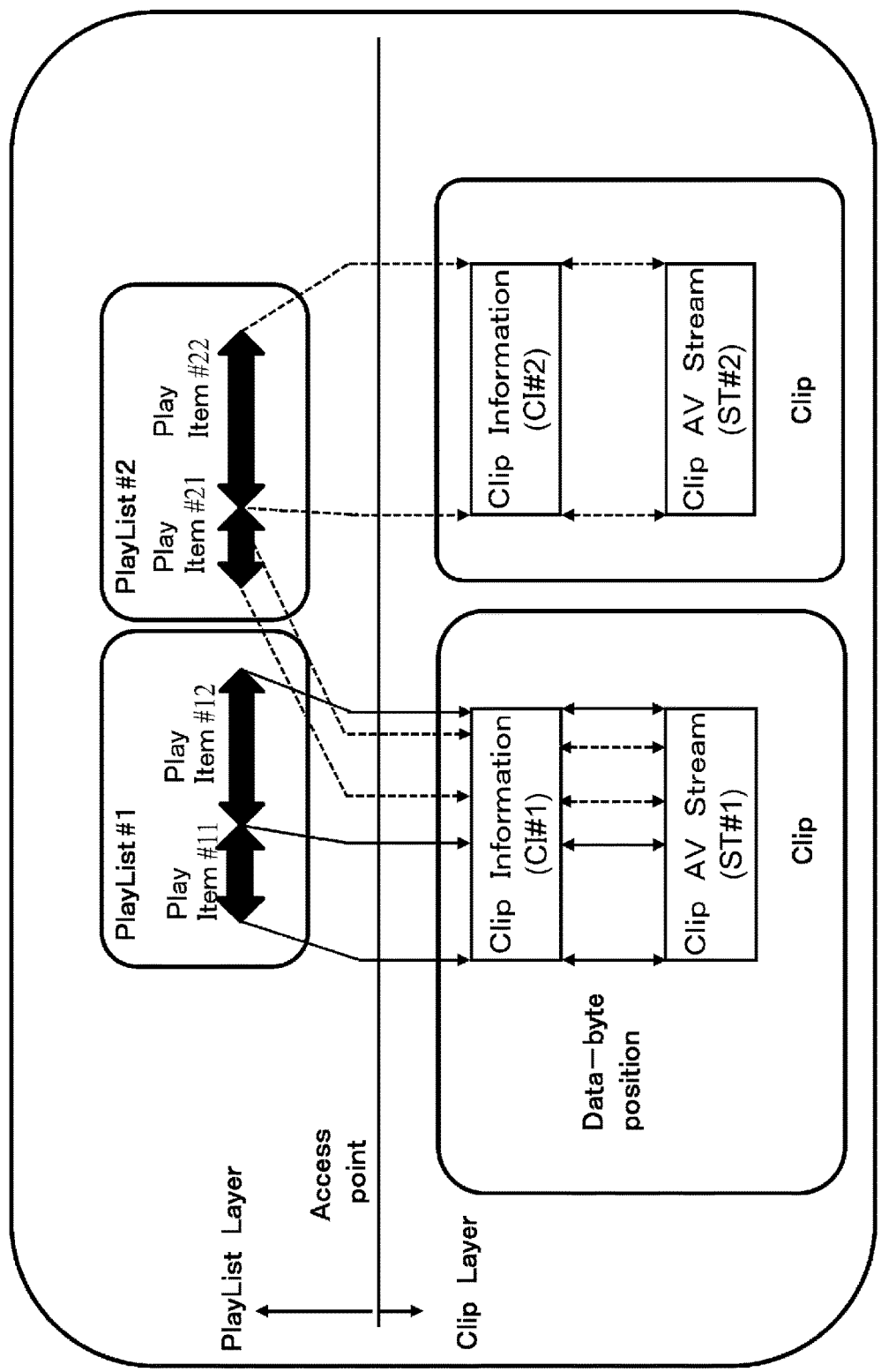
FIG. 11 is an explanation diagram of a reproduction processing example with a play list applied thereto.

FIG. 11 is an explanation diagram of correspondence relations among the following data recorded on the information recording medium 101.

The play list file,
the clip information file, and
the clip AV stream file.

AV streams each including image data and voice data which are actual reproduction target data are recorded as clip AV stream files. In addition, the play list file and the clip information file are prescribed as management information and reproduction control information files for these AV streams.

As illustrated in FIG. 11, these files of a plurality of categories can be classified into the following two layers.

A play list layer including play list files, and
a clip layer including clip AV stream files and clip information files.

Note that, one clip information file is associated with one clip AV stream file. A pair of them is regarded as one object, and the pair is collectively referred to as clip in some cases.

Control information applied to reproduction of data included in the clip AV stream file is recorded in the play list file or the clip information file.

The clip AV stream file stores data obtained by disposing, for example, MPEG2 TS (transport stream) in accordance with a prescribed structure of the BDMV format.

Furthermore, the clip information file stores, for example, a data position of byte row data in the clip AV stream file, and management information used to acquire a reproduction start position and the like of storage data in the clip AV stream file, such as corresponding data of a reproduction time position and the like of an entry point (EP) which is a reproduction start point in a case where development onto a time axis is conducted.

For example, when a time stamp which indicates a reproduction time elapse position from a start point of contents is given, it becomes possible to acquire a data readout position of the clip AV stream file, i.e., an address functioning as a reproduction start point by referring to the clip information file.

The play list file has specifying information of a reproduction section for reproducible data included in the clip (=clip information file+clip AV stream file) layer.

At least one play item is set in the play list file. Each play item has specifying information of a reproduction section for reproducible data included in the clip (=clip information file+clip AV stream file) layer.

(5. Reproduction Example of Superposed Image Data Utilizing a Plurality of Data Files)

A reproduction example of superposed image data utilizing a plurality of data files will now be described with reference to FIG. 12.

Figure 12:
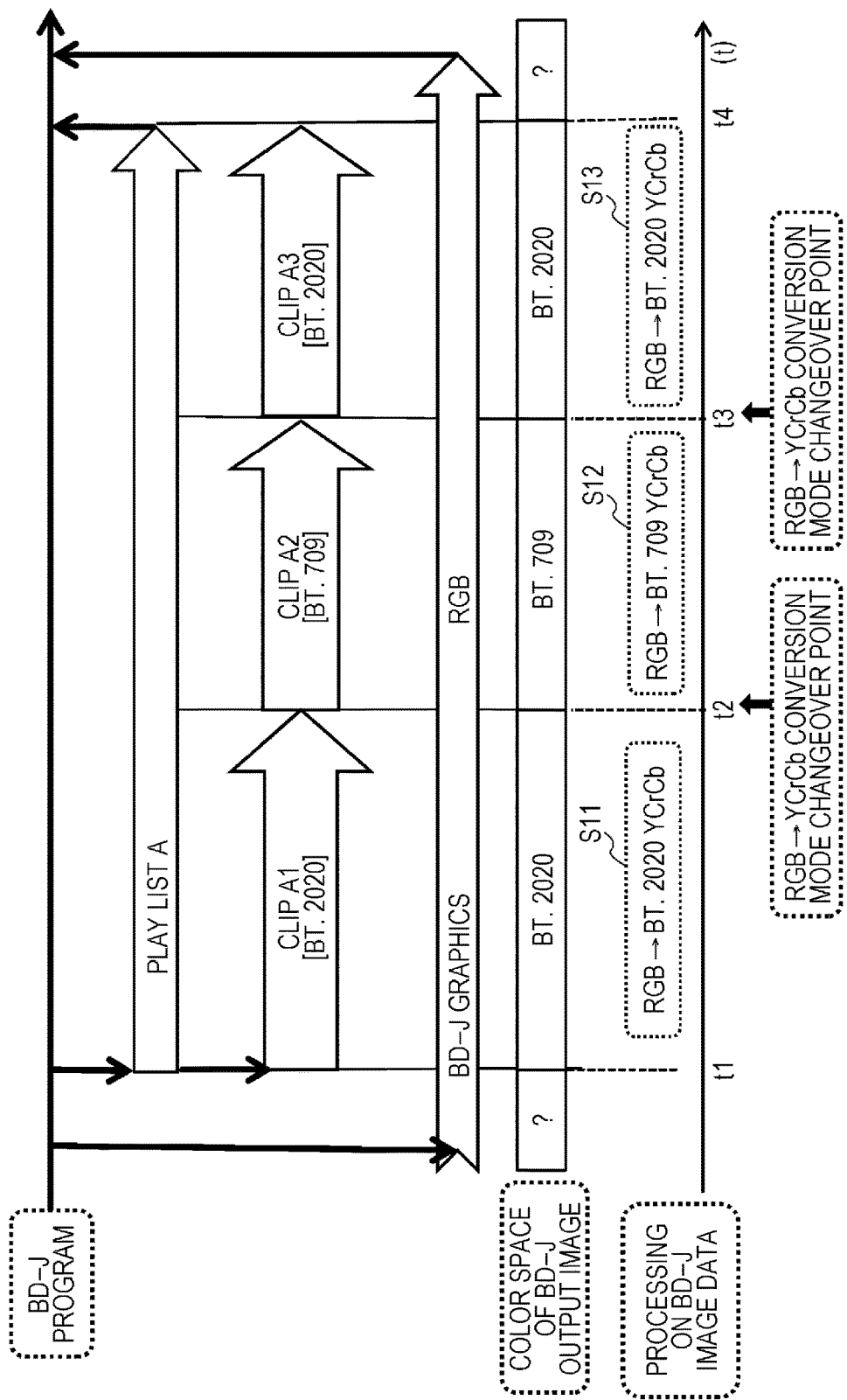
FIG. 12 is an explanation diagram of clip reproduction conducted in accordance with a play list, superposition processing of BD-J graphics, and a reproduction processing example.

A data reproduction example illustrated in FIG. 12 is an example of a reproduction processing sequence to which a clip AV stream file that stores a main image such as a movie and BD-J graphics are applied together.

Time elapses from the left to the right on a time axis (t) illustrated in the lowest stage of FIG. 12, and reproduction processing proceeds.

FIG. 12 illustrates a reproduction processing example utilizing three clips selected by one play list.

Note that, it is supposed in the ensuing description that a "clip" includes a clip AV stream file and a clip information file.

A clip A1 is a clip that stores image data in the color space BT. 2020.

A clip A2 is a clip that stores image data in the color space BT. 709.

A clip A3 is a clip that stores image data in the color space BT. 2020.

Reproduction processing is supposed to be conducted by applying these three clips in order.

Together with reproduction processing of a movie or the like with these three clips storing the main image applied, superposition processing of BD-J graphics data which is a sub-image is supposed to be executed.

Here, the BD-J image is supposed to be image data in the color space BT. 709.

The image processing unit in the information processing device 102 which executes data reproduction processing conducts conversion processing of the color space of the BD-J image in accordance with the above-described embodiment. In other words, the image processing unit executes the color space conversion processing of the BD-J image to cause the color space of the BD-J image to coincide with the color space of the main image.

The BD-J image data is supposed to be RGB data in the color space BT. 709.

In the example illustrated in FIG. 12, reproduction of the clip A1 storing the image data in the color space BT. 2020 is executed during a period between time t1 and t2.

During the period between time t1 and t2, therefore, the image processing unit executes processing indicated by step S11 in FIG. 12, i.e., processing of converting RGB data in BT. 709 which is BD-J image data to a YCbCr signal in BT. 2020, superposing the YCbCr signal in BT. 2020 on the main image in BT. 2020, i.e., the clip storage image, and outputting a resultant image.

During the next period between time t2 and t3, reproduction of the clip A2 storing the image data in the color space BT. 709 is executed.

During the period between time t2 and t3, therefore, the image processing unit conducts processing indicated by step S12 in FIG. 12. In other words, the image processing unit does not conduct color space conversion on the RGB data in BT. 709 which is the BD-J image data, but superposes the RGB data in BT. 709 on the main image in BT. 709 as a YCrCb signal in BT. 709, and outputs a resultant image.

During the next period between time t3 and t4, reproduction of the clip A3 storing the image data in the color space BT. 2020 is executed.

During the period between time t3 and t4, therefore, the image processing unit executes processing indicated by step S13 in FIG. 12. In other words, the image processing unit executes processing of converting the RGB data in BT. 709 which is the BD-J image data to a YCbCr signal in BT. 2020, superposing the YCbCr signal in BT. 2020 on the main image in BT. 2020, i.e., the clip storage image, and outputting a resultant image.

It becomes possible to provide an image having a sense of uniformity by causing the color space of the sub-image to coincide with the color space of the main image and generating the superposed image in this way.

(6. Storage Area of Color Space Information)

When generating and outputting a superposed image of a main image and sub-images stored in a plurality of different data files, the image processing unit in the information processing device 102 according to the present disclosure executes processing of causing the color spaces of the sub-images to coincide with the color space of the main image, as described above.

For conducting this color space conversion processing, it is necessary to acquire color space information of the main image and color space information of the sub-images.

In other words, as for the main image and the sub-images, color space information of each image data is held as meta data which is attribute information of each image. The image processing unit in the information processing device 102 acquires meta data of each image, judges the color space of each image on the basis of the acquired information, and conducts color space conversion processing in accordance with a result of the judgment.

Figure 13:
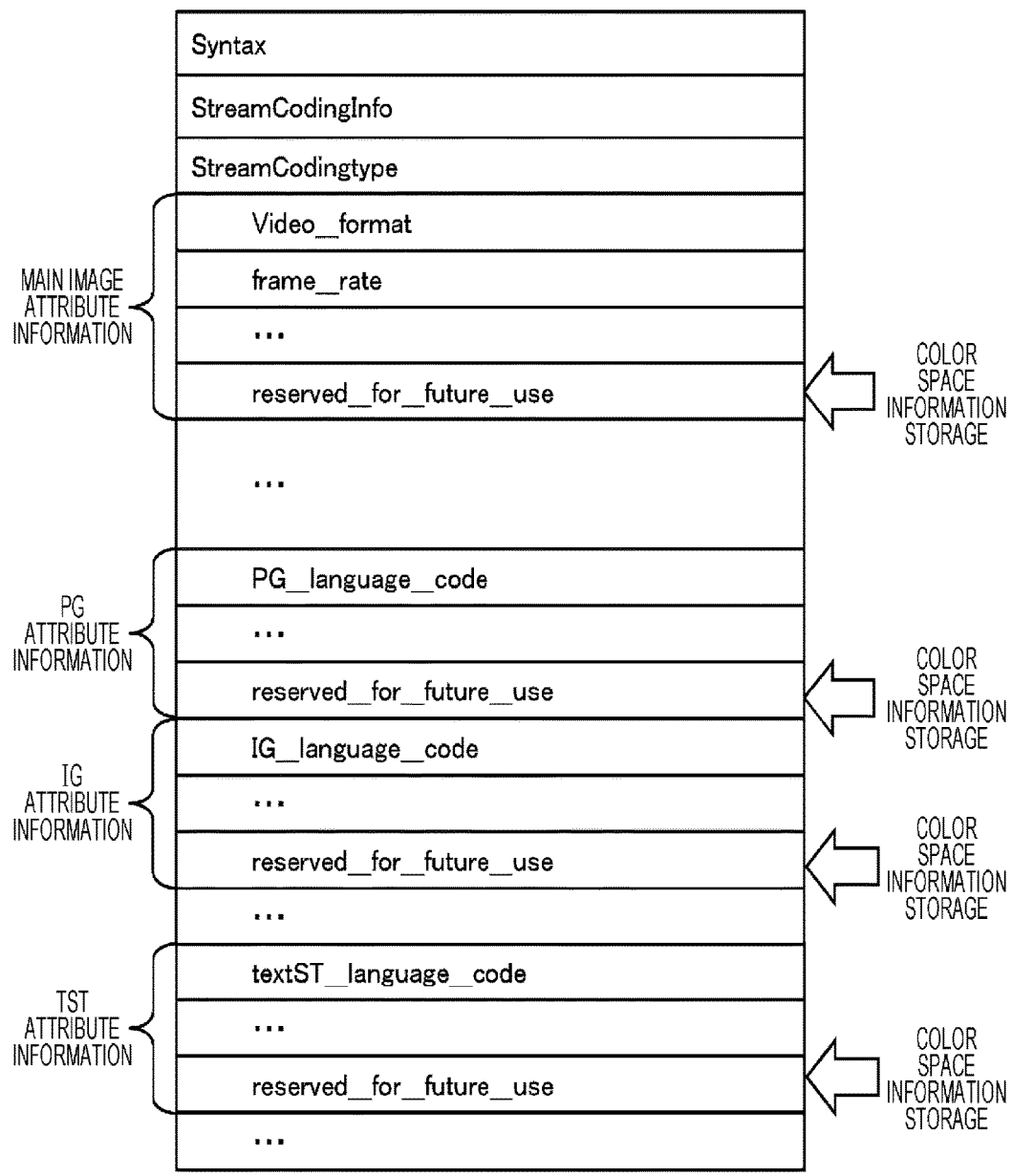
FIG. 13 is an explanation diagram of a storage example of color space information.

FIG. 13 is an explanation diagram of an example of a storage configuration of color space information.

A data configuration example of a clip information file is illustrated in FIG. 13.

The clip information file is set as a file that stores reproduction control information and attribute information concerning reproduction target data, i.e., reproduced data stored in the clip AV stream file.

It is possible to store color space information of the main image and the sub-images stored in the clip AV stream file in the clip information file.

Specifically, color space information of each image is stored in reserve fields (reserved_for_future_use) described below and set in the clip information file as illustrated in FIG. 13.

(a) As for the main image, color space information of the main image is stored in a reserve field (reserved_for_future_use) which is set in an attribute information recording field for the main image.

(b) As for presentation graphics (PG), interactive graphics (IG), and text subtitle (TST) which are sub-images, color space information of these sub-images is stored in reserve fields (reserved_for_future_use) which are set in attribute information recording fields respectively for the PG, IG and TST.

Note that, as for BD-J graphics which is another sub-image, color space information is recorded in the BDJO file.

Note that, the example illustrated in FIG. 13 is an example in which color space information of each image is recorded in a reserve field that is set in stream coding information (StreamCodingInfo) which is set in the clip information file. However, the recording destination of color space information is not restricted to the configuration illustrated in FIG. 13, but a configuration in which color space information is recorded in other fields may also be used.

As other recording destination candidates of color space information other than the stream coding information (StreamCodingInfo) illustrated in FIG. 13, there are, for example, the following candidates.

A reserve field (reserved_for_future use) that is set in terminal information (TerminalInfo) in the clip information file, or class device configuration information.

It is possible to set to record color space information in one of them.

Note that, as for an example of concrete recording of color space information on these various recording destinations, it is possible to set to, for example, record a different flag or a constant depending upon whether the image is a BT. 709 image or a BT. 2020 image. In this case, a reproduction program executed by the information processing device which executes reproduction processing acquires recorded data in these fields and executes color space judgment processing on the basis of the acquired data.

The image processing unit in the information processing device 102 reads out attribute information of each image, when reading out respective images and generating a superposed image. In a case where the color space of the main image does not coincide with the color space of a sub-image, the image processing unit in the information processing device 102 executes color space conversion to cause the color space of the sub-image to coincide with the color space of the main image. Thereafter, the image processing unit in the information processing device 102 executes superposition processing of images, and generates and outputs an image formed by image signals according to one color space.

Besides, for example, in a case where image data is HEVC (High Efficiency Video Coding) data, it is possible to record the above-described color space information in a meta data recording area in the HEVC video stream (for example, SEI (supplemental enhancement information) field).

Note that, in this case, setting of directly recording the color space information such as, for example, BT. 709 and BT. 2020 is not restrictive. Setting of recording parameters used to determine color information may be conducted.

Specifically, for example, the following color information parameters are recorded.

VUI/Color Description (a) color_primaries (b) transfer_characterstics (c) matrix_coeffs For example, in a case where image data is image data in color space BT. 709, preset values of the above-described parameters are recorded as follows.

(a) color primaries=1
green: x=0.300, y=0.600
blue: x=0.150, y=0.060
red: x=0.640, y=0.330
whiteD65: x=0.3127, y=0.3290
(b) transfer_characterstics=1
V=1.099 × $Lc^{0.45}$ ? 0.099 for 1 ? Lc ? 0.018
V=4.500 × Lc for 0.018>Lc ? 0
(c) matrix_coeffs=1
$K_R$=0.2126, $K_B$=0.0722

For example, the parameters preset as described above are previously recorded as attribute data (meta data) of the HEVC stream.

The image processing unit in the information processing device which executes reproduction processing judges this HEVC stream image to be image data in color space BT. 709 on the basis of these parameters.

(7. Image that Becomes Reproduction Processing Target)

The embodiments have been described supposing that the image that becomes the reproduction processing target is data stored on an information recording medium such as a BD. Besides, in a case where data stored on a hard disc or an external device, or data received from an external server or a broadcast station via a network or a broadcast communication network is reproduced, however, the processing according to the present disclosure can also be applied. Note that, in a case where image data is input from the external, color space information of the image is also acquired from attribute information which is input from the external.

Furthermore, the processing according to the present disclosure can also be applied to an image displayed in accordance with HTML or XML which is a mark up language utilized to display Web pages and the like.

For example, HTML 5 basically utilizes color space of sRGB. The sRGB color space is color space nearly equal to the color space of BT. 709. However, the color space used in actual display depends upon the environment of HTML 5 browser. It is preset to refer to VUI/COLOR PRIMARY in a video stream and conduct suitable color space conversion if video reproduction is conducted using a VIDEO tag of HTML 5. Specifically, it is preset that the color space is converted to color space for display of HTML 5 browser.

Therefore, the above-described processing according to the present disclosure can be applied by, for example, adding the attribute information of the color space to the HTML 5 itself.

(8. Processing Sequence Executed by Information Processing Device)

A sequence of processing executed by the information processing device will now be described with reference to a flow chart illustrated in FIG. 14.

Figure 14:
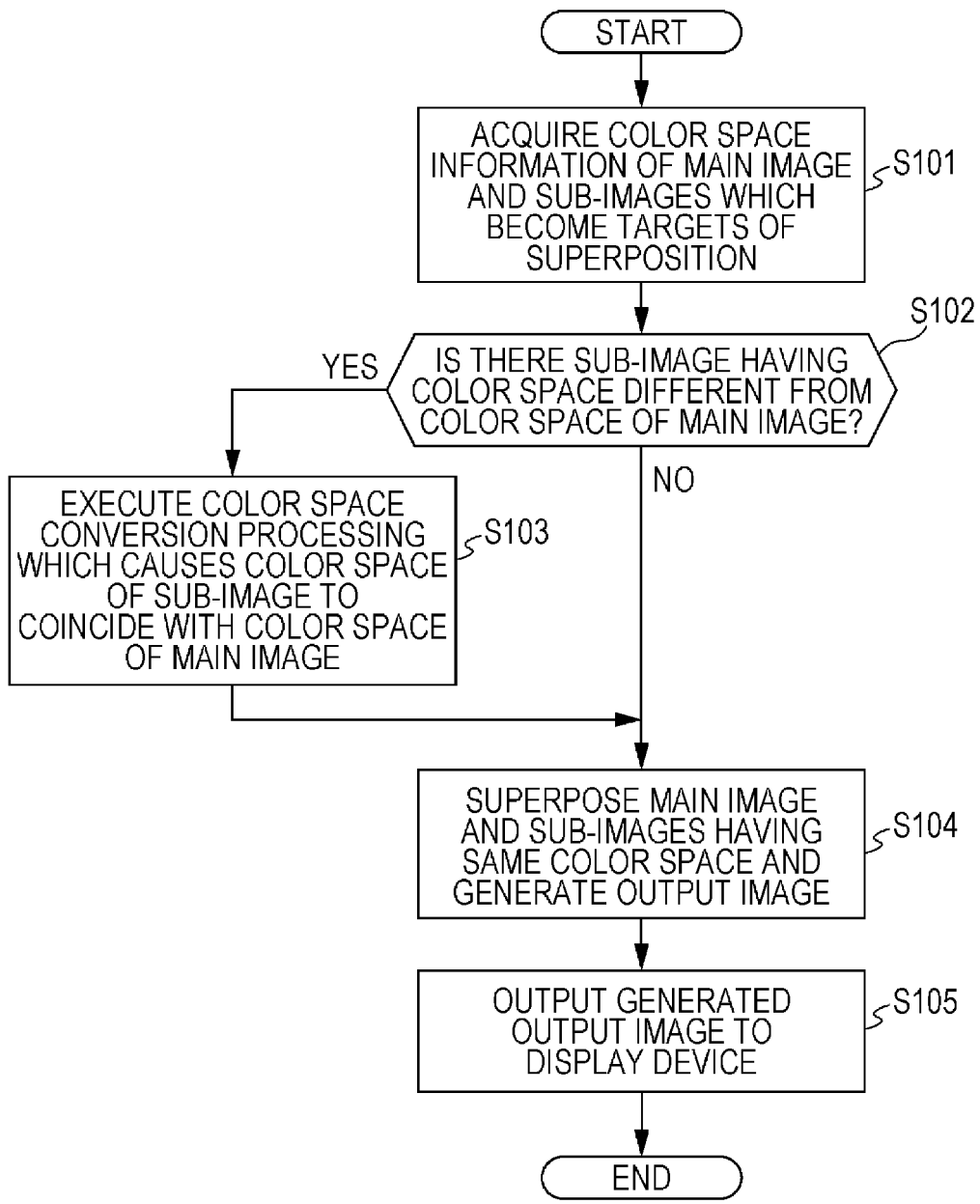
FIG. 14 is a diagram illustrating a flow chart for explanation of a processing sequence executed by the information processing device.

Processing according to the flow illustrated in FIG. 14 is executed in the image processing unit in the information processing device 102. A program which causes the image processing unit to execute the processing according to the flow illustrated in FIG. 14 is stored in a storage unit in the information processing device. For example, a CPU in the image processing unit having a program execution function executes this program and executes the processing according to the flow illustrated in FIG. 14.

Hereafter, processing at each step will be described.

(Step S101)

First, at step S101, the image processing unit acquires attribute information (meta data) of a plurality of images which become targets of the superposition processing and reproduction, and acquires color space information of each image.

(Step S102)

Then, at step S102, the image processing unit determines whether there is a sub-image having color space different from the color space of the main image.

In a case where a sub-image having color space different from the color space of the main image is judged to be present, the image processing unit proceeds to step S103.

On the other hand, in a case where a sub-image having color space different from the color space of the main image is judged not to be present, the image processing unit proceeds to step S104.

(Step S103)

In the case where a sub-image having color space different from the color space of the main image is judged to be present at step S102, the image processing unit conducts processing of causing the color space of the sub-image having color space different from the color space of the main image to coincide with the color space of the main image at step S103. In other words, the image processing unit executes color space conversion processing on the sub-image.

(Step S104)

In the case where a sub-image having color space different from the color space of the main image is judged not to be present at step S102, or in the case where a sub-image having color space different from the color space of the main image is judged to be present at step S102 and the color space conversion processing on the sub-image is finished at step S103, the image processing unit proceeds to step S104.

At step S104, the image processing unit executes superposition processing of the main image and the sub-images all of which are set into the same color space and generates an output image.

(Step S105)

Finally, at step S105, an output image generated by superposition processing of a plurality of images is output to the display device.

(9. Configuration Example of Information Processing Device)

Finally, a configuration example of the information processing device which executes the processing according to the present disclosure will now be described with reference to FIG. 15.

Figure 15:
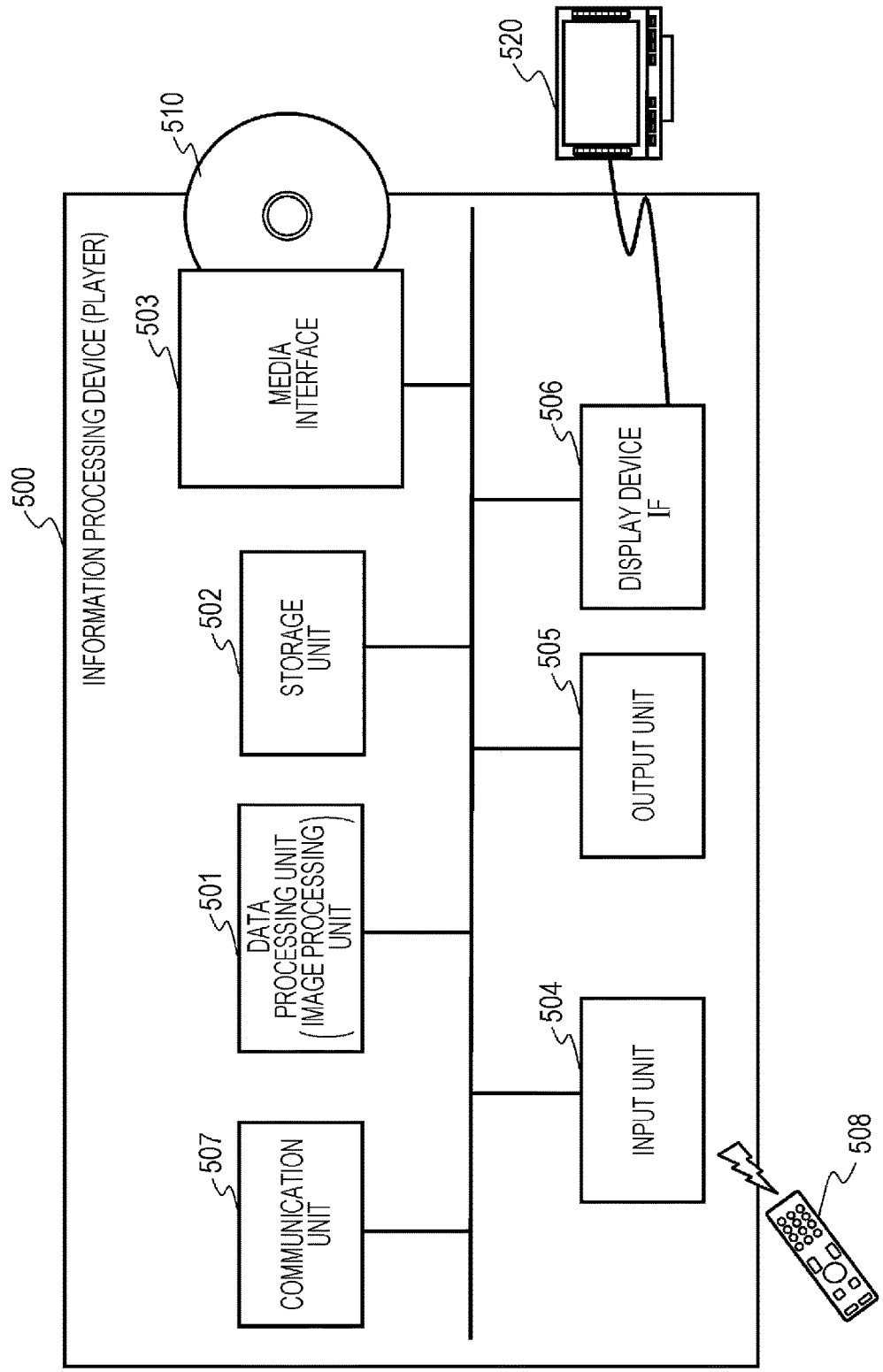
FIG. 15 is an explanation diagram of a configuration example of the information processing device.

An information processing device 500 illustrated in FIG. 15 is equivalent to the information processing device 102 illustrated in FIG. 1.

For example, the information processing device 500 executes data reproduction from an information recording medium, and outputs a reproduced image to the display device.

The information processing device 500 has a configuration capable of mounting, for example, media 510 which is an information recording medium with reproduction contents recorded thereon.

A media interface 503 is an interface applied to data reproduction processing utilizing the media 510. The media interface 503 conducts data reading processing and the like utilizing the media 510 in accordance with a request from a data processing unit 501 which executes image processing and the like.

The media 510 include various media (information recording medium) such as, for example, a Blu-ray (registered trademark) Disc, a DVD, a hard disc, or a flash memory.

As illustrated in FIG. 15, the information processing device 500 further includes a data processing unit (image processing unit) 501, a storage unit 502, an input unit 504, an output unit 505, a display device IF 506, and a communication unit 507.

The data processing unit 501 includes a CPU or the like having a program execution function, and executes, for example, data recording and reproduction processing. In addition, the data processing unit 501 exercises data communication control or the like via the communication unit 507. Specifically, the data processing unit 501 exercises general control on processing executed by the device such as communication control at the time when receiving data from an external device such as server.

The storage unit 502 includes a RAM, a ROM or the like. The storage unit 502 is utilized as, for example, a storage area of a program executed in the data processing unit 501, various parameters, and received data.

The communication unit 507 is utilized in processing of communication with, for example, an external device, a server, a broadcast station and the like. The input unit 504 is an operation unit of, for example, a user, and various inputs such as inputs of a data recording or reproduction order and a copy order are given. Note that, a remote controller 508 is also included in the input unit 504, and it is also possible to input remote controller operation information. The output unit 505 includes a display unit, a speaker, and the like to display a message presented to the user and output an alarm sound.

The display device IF 506 outputs a reproduced image such as, for example, an image generated by superposing a plurality of image data to a display device 520 such as a television.

(10. Summary of Configuration According to Present Disclosure)

Heretofore, the embodiments according to the present disclosure have been described in detail with reference to specific embodiments. However, it is apparent that those skilled in the art can conduct modification and substitution on the embodiments without departing from the spirit of the present disclosure. In other words, the present invention has been disclosed in the form of exemplification, and the embodiments should not be construed to limit the present invention. For judging the spirit of the present disclosure, claims should be taken into consideration.

Note that, the technology disclosed in the present specification can take configurations described hereafter.

(1) An information processing device including:

an image processing unit configured to superpose a plurality of image data and generate a display image, the image processing unit being configured to acquire color space information of a main image and color space information of sub-images to be superposed on the main image, and in a case where a color space of a sub-image is different from a color space of the main image, the image processing unit being operable to execute color space conversion processing of causing the color space of the sub-image to coincide with the color space of the main image, generate an image signal for superposition having same color space as the color space of the main image, superpose the generated image signal for superposition on the main image, and generate an output image signal.

(2) The information processing device according to (1), wherein the image processing unit is configured to execute processing of superposing a sub-image having a palette entry identifier of a palette corresponding to a predetermined color space as color information on the main image, and the image processing unit includes:

a color conversion unit configured to convert the palette entry identifier of the sub-image to an image signal corresponding to same color space as that of the palette; and a color space conversion unit configured to convert the image signal generated by the color conversion unit to an image signal for superposition having the same color space as the color space of the main image.

(3) The information processing device according to (1) or (2), wherein the image processing unit is configured to execute processing of superposing a sub-image having an RGB signal corresponding to a predetermined color space as color information on the main image, and the image processing unit includes:

a color conversion unit configured to convert the RGB signal of the sub-image to an image signal corresponding to same color space as that of the RGB signal; and a color space conversion unit configured to convert the image signal generated by the color conversion unit to an image signal for superposition having the same color space as the color space of the main image.

(4) The information processing device according to any of (1) to (3), wherein the image processing unit is configured to execute processing of superposing a sub-image having a palette entry identifier of a palette corresponding to a predetermined color space as color information on the main image, and the image processing unit includes a color conversion unit configured to convert the palette entry identifier of the sub-image directly to an image signal for superposition having same color space as the color space of the main image.

(5) The information processing device according to (4), wherein the image processing unit includes a color space conversion unit configured to generate a look up table that associates a palette entry identifier of a palette corresponding to a color space of the sub-image with an image signal of the color space of the main image different from the color space of the sub-image, and the color conversion unit converts the palette entry identifier of the sub-image directly to an image signal for superposition having same color space as the color space of the main image by using the look up table generated by the color space conversion unit.

(6) The information processing device according to any of (1) to (5), wherein the color space of the main image is BT. 2020 or BT. 709, and in a case where a color space of a sub-image is different from a color space of the main image, the image processing unit executes color space conversion processing to cause the color space of the sub-image to coincide with BT. 2020 or BT. 709 which is the color space of the main image.

(7) The information processing device according to any of (1) to (6), wherein the image processing unit acquires color space information of each of the main image and the sub-images from attribute information corresponding to each image.

(8) The information processing device according to any of (1) to (7), wherein the main image and the sub-images are image data recorded on an information recording medium, and the image processing unit acquires color space information of each of the images from attribute information recording file recorded on the information recording medium.

(9) The information processing device according to (8), wherein the main image and the sub-images are stored in a clip AV stream file, and the image processing unit acquires color space information of each image from a clip information file recorded on an information recording medium.

(10) The information processing device according to any of (1) to (7), wherein at least one image out of the main image and the sub-images is data which is input from external via a communication unit, and the image processing unit acquires color space information of the image which is input from the external from attribute information which is input from the external.

(11) An information recording medium storing:
main image data;
color space information of the main image;
sub-image data to be superposed on the main image; and
color space information of the sub-images, the information recording medium making it possible to cause a reproduction device configured to superpose the main image and the sub-images and generate a display image to acquire color space information of each image and conduct color space conversion processing to make color spaces of the images coincide with each other.

(12) An image processing method executed in an information processing device, the image processing method including:

causing an image processing unit to execute processing of acquiring color space information of a main image and color space information of each of sub-images to be superposed on the main image;

in a case where a color space of a sub-image is different from a color space of the main image, causing the image processing unit to execute color space conversion processing to cause the color space of the sub-image to coincide with the color space of the main image and processing of generating an image signal for superposition having same color space as the color space of the main image; and causing the image processing unit to execute processing of superposing the image signal for superposition on the main image and generating an output image signal.

(13) A program configured to cause image processing to be executed in an information processing device, the program causing an image processing unit to execute:

processing of acquiring color space information of a main image and color space information of each of sub-images to be superposed on the main image;

in a case where a color space of a sub-image is different from a color space of the main image, color space conversion processing to cause the color space of the sub-image to coincide with the color space of the main image and processing of generating an image signal for superposition having same color space as the color space of the main image; and processing of superposing the image signal for superposition on the main image and generating an output image signal.

(14) An information processing apparatus including:
circuitry configured to: receive a first image, a second image and first color space information indicating a first color space of the first image; convert a second color space of the second image to a converted color space same as the first color space, when the second color space is different from the first color space; and generate a display image including the first image and the second image having the converted color space.

(15) The information processing apparatus according to (14), wherein the display image is generated by superposing the second image on the first image.

(16) The information processing apparatus according to (14) or (15), wherein the circuitry is configured to:
receive second color space information indicating the second color space of the second image, and convert the second color space of the second image based on the first color space information and the second color space information.

(17) The information processing apparatus according to any one of (14) to (16), wherein the circuitry is configured to determine color space of the second image based on a format of the second image.

(18) The information processing apparatus according to any one of (14) to (17), wherein the circuitry is configured to: control superposing the second image having a palette entry identifier of a palette corresponding to a predetermined color space as color information on the first image, convert the palette entry identifier of the second image to an image signal corresponding to a same color space as the palette, and convert the image signal to another image signal for superposition having the same color space as the first color space of the first image.

(19) The information processing apparatus according to any one of (14) to (18), wherein the circuitry is configured to: control superposing the second image having an RGB signal corresponding to a predetermined color space as color information on the first image, convert the RGB signal of the second image to an image signal corresponding to a same color space as the RGB signal, and convert the image signal to another image signal for superposition having the same color space as the first color space of the first image.

(20) The information processing apparatus according to any one of claims (14) to (19), wherein the circuitry is configured to: control superposing the second image having a palette entry identifier of a palette corresponding to a predetermined color space as color information on the first image, and convert the palette entry identifier of the second image directly to an image signal for superposition having the same color space as the first color space of the first image.

(21) The information processing apparatus according to any one of (14) to (20), wherein the circuitry is configured to: generate a look up table that associates a palette entry identifier of a palette corresponding to the second color space of the second image with an image signal of the first color space of the first image, in which the first color space of the first image is different from the second color space of the second image; and convert the palette entry identifier of the second image directly to the image signal for superposition having the same color space as the first color space of the first image by using the look up table.

(22) The information processing apparatus according to any one of (14) to (21), wherein the first color space of the first image is BT. 2020 or BT. 709, and when the second color space of the second image is different from the first color space of the first image, the circuitry executes color space conversion processing to cause the second color space of the second image to coincide with the first color space of the first image.

(23) The information processing apparatus according any one of (14) to (22), wherein the circuitry acquires the first color space information of the first image and second color space information of the second image from attribute information corresponding respectively to the first and second images.

(24) The information processing apparatus according to any one of (14) to (23), wherein the first image and the second image are image data recorded on an information recording medium, and the circuitry acquires the first color space information of the first image and second color space information of the second image from an attribute information recording file recorded on the information recording medium.

(25) The information processing apparatus according to any one of (14) to (24), wherein the first image and the second image are stored in a clip AV stream file or clip AV stream files, and the circuitry acquires the first color space information of the first image and second color space information of the second image from a clip information file or clip information files recorded on an information recording medium.

(26) The information processing apparatus according to any one of (14) to (25), wherein at least one image of the first image or the second image is data which is input from external to the information processing device via a communication unit, and wherein the circuitry acquires color space information of the at least one image from attribute information which is input from external to the information processing device.

(27) An information recording medium storing:

first image data of a first image, first color space information indicating a first color space of the first image, and second image data of a second image; and the information recording medium making it possible to cause a reproduction device configured to generate a display image including the first image and the second image having a converted color space, to convert a second color space of the second image to the converted color space same as the first color space, when the second color space is different from the first color space.

(28) The information recording medium according to (27), wherein the display image is generated by superposing the second image on the first image.

(29) The information recording medium according to (27) or (28), wherein the reproduction device is configured to:

receive second color space information indicating the second color space of the second image, and convert the second color space of the second image based on the first color space information and the second color space information.

(30) The information recording medium according to any one of (27) to (29), wherein the second color space of the second image is based on a format of the second image.

(31) An image processing method including:

receiving a first image, a second image and first color space information indicating a first color space of the first image; converting a second color space of the second image to a converted color space same as the first color space, when the second color space is different from the first color space; and generating a display image including the first image and the second image having the converted color space.

(32) The image processing method according to (31), wherein the generating of the display image is by superposing the second image on the first image.

(33) The image processing method according to (31) or (32) further comprising:

receiving second color space information indicating the second color space of the second image, and converting the second color space of the second image based on the first color space information and the second color space information.

(34) The image processing method according to any one of (31) to (33) further comprising:

determining color space of the second image based on a format of the second image.

(35) A non-transitory recording medium on which is recorded a program having instructions that, when executed by circuitry, configure the circuitry to:

receive a first image, a second image and first color space information indicating a first color space of the first image; convert a second color space of the second image to a converted color space same as the first color space, when the second color space is different from the first color space; and generate a display image including the first image and the second image having the converted color space.

(36) The non-transitory recording medium according to (35),
wherein the display image is generated by superposing the second image on the first image.

(37) The non-transitory recording medium according to (35) or (36),
wherein, when the instructions are executed by the circuitry, the circuitry is configured to:
receive second color space information indicating the second color space of the second image, and convert the second color space of the second image based on the first color space information and the second color space information.

(38) The non-transitory recording medium according to any one of (35) to (37),
wherein, when the instructions are executed by the circuitry, the circuitry is configured to: determine color space of the second image based on a format of the second image.

Furthermore, it is possible to execute a series of processing described in the specification by using hardware that may include circuitry, software, or a compound configuration of hardware and software. When executing processing using software, it is possible to execute the processing by installing a program with a processing sequence recorded therein into a memory in a computer which is incorporated in dedicated hardware or installing the program into a general purpose computer capable of executing various kinds of processing. For example, the program can be previously recorded on recording media. The program from the recording media can be installed into a computer. Besides, it is possible to receive the program via a network such as a LAN (Local Area Network) or the Internet and install the program onto recording media such as an internal hard disc.

Note that, various kinds of processing described in the specification may be executed not only in time series according to the description, but also in parallel or individually according to the processing capability of a device which executes the processing or as occasion demands. Furthermore, in the present specification, a system is a logical assembly configuration of a plurality of devices, and component devices are not necessarily housed in the same casing.

INDUSTRIAL APPLICABILITY

According to the configuration of an embodiment of the present disclosure, a sense of incongruity in the case where image data in different color spaces are superposed and displayed is dissolved and display of superposed images in unified color space is implemented, as described heretofore.

Specifically, the image processing unit acquires color space information of the main image and color space information of the sub-images to be superposed on the main image. In addition, in the case where the color space of a sub-image is different from the color space of the main image, the image processing unit executes color space conversion processing to cause the color space of the sub-image to coincide with the color space of the main image, and generates an image signal for superposition having the same color space as that of the main image. Then, the image processing unit superposes the generated image signal for superposition on the main image and outputs a resultant signal. The image processing unit executes, for example, color space conversion utilizing a look up table on an image signal including a palette entry id or an RGB signal.

Owing to the present configuration, the sense of incongruity in the case where image data in different color spaces are superposed and displayed is dissolved, and superposed image display in the unified color space can be implemented.

REFERENCE SIGNS LIST

101 Information recording medium
102 Information processing device
103 Operation unit (remote controller)
104 Display device
105 Connection cable
151 Main image
152 First sub-image
153 Second sub-image
154 Color conversion unit
155 Color conversion unit
156 Superposition unit
157 Image data for display
201 Main image
202 First sub-image
203 Second sub-image
204 Color conversion unit
205 Color conversion unit
206 Color space conversion unit
207 Color space conversion unit
208 Superposition unit
209 Image data for display
301 All color LUT
302 Color space conversion unit
303 All color LUT
304 Color conversion unit
500 Information processing device
501 Data processing unit
502 Storage unit
503 Media interface
504 Input unit
505 Output unit
506 Display device IF
507 Communication unit
508 Remote controller

The invention claimed is:
1. An information processing apparatus comprising:
circuitry configured to:
receive a first image, a second image and first color space information indicating a first color space of the first image;
convert a second color space of the second image to a converted color space same as the first color space, when the second color space is different from the first color space;
generate a display image including the first image and the second image having the converted color space;
generate a look up table that associates a palette entry identifier of a palette corresponding to the second color space of the second image with an image signal of the first color space of the first image, in which the first color space of the first image has a first color area and the second color space of the second image has a second color area different from the first color area, and in which the look up table is generated from a second look up table having correspondence data between a second palette entry identifier corresponding to the second color space and a second image signal in the second color space by performing a color space conversion on the second look up table whereby the look up table has a color area that is different from a color area of the second look up table, the color space conversion on the second look up table comprising, for each of a plurality of second color space values in the second color space, rewriting the second color space value as a first color space value, and associating with the first color space value the second palette entry identifier provided in the second look up table for the second color space value, so as to generate the look up table comprising a plurality of first color space values associated with respective second palette entry identifiers; and convert a palette entry identifier of the second image directly to an image signal for superposition having the same color area as the first color space of the first image by using the look up table.

2. The information processing apparatus according to claim 1, wherein the display image is generated by superposing the second image on the first image.

3. The information processing apparatus according to claim 1, wherein the circuitry is configured to:
receive second color space information indicating the second color space of the second image, and
convert the second color space of the second image based on the first color space information and the second color space information.

4. The information processing apparatus according to claim 1, wherein the circuitry is configured to determine color area of a color space of the second image based on a format of the second image.

5. The information processing apparatus according to claim 1, wherein the circuitry is configured to:
control superposing the second image having a palette entry identifier of a given palette corresponding to a predetermined color space having a predetermined color area as color information on the first image,
convert the palette entry identifier of the second image to an image signal corresponding to a same color space having a same color area as the given palette, and
convert the image signal to another image signal for superposition having the same color area as the first color space of the first image.

6. The information processing apparatus according to claim 1, wherein the circuitry is configured to:
control superposing the second image having an RGB signal corresponding to the second color space as color information on the first image.

7. The information processing apparatus according to claim 1, wherein the circuitry is configured to:
control superposing the image signal for superposition on the first image.

8. The information processing apparatus according to claim 1, wherein the first color space of the first image is BT. 2020 or BT. 709, and
the circuitry executes color space conversion processing to cause the second color space of the second image to coincide with the first color space of the first image.

9. The information processing apparatus according to claim 1, wherein the circuitry acquires the first color space information of the first image and second color space information of the second image from attribute information corresponding respectively to the first and second images.

10. The information processing apparatus according to claim 1, wherein the first image and the second image are image data recorded on an information recording medium, and
the circuitry acquires the first color space information of the first image and second color space information of the second image from an attribute information recording file recorded on the information recording medium.

11. The information processing apparatus according to claim 10, wherein the first image and the second image are stored in a clip AV stream file or clip AV stream files, and
the circuitry acquires the first color space information of the first image and second color space information of the second image from a clip information file or clip information files recorded on an information recording medium.

12. The information processing apparatus according to claim 1, wherein at least one image of the first image or the second image is data which is input from external to the information processing device via a communication unit, and
wherein the circuitry acquires color space information of the at least one image from attribute information which is input from external to the information processing device.

13. A non-transitory recording medium configured to store a program executable by a computer and first image data of a first image, first color space information indicating a first color space of the first image, and second image data of a second image; and wherein the program comprises:
causing a reproduction device configured to generate a display image including the first image and the second image having a converted color space, to convert a second color space of the second image to the converted color space same as the first color space, when the second color space has a second color area different from a first color area of the first color space,
in which the second color space of the second image is converted to the converted color space same as the first color space by
generating a look up table that associates a palette entry identifier of a palette corresponding to the second color space of the second image with an image signal of the first color space of the first image, in which the look up table is generated from a second look up table having correspondence data between a second palette entry identifier corresponding to the second color space and a second image signal in the second color space by performing a color space conversion on the second look up table whereby the look up table has a color area that is different from a color area of the second look up table, the color space conversion on the second look up table comprising, for each of a plurality of second color space values in the second color space, rewriting the second color space value as a first color space value, and associating with the first color space value the second palette entry identifier provided in the second look up table for the second color space value, so as to generate the look up table comprising a plurality of first color space values associated with respective second palette entry identifiers, and converting a palette entry identifier of the second image directly to an image signal for superposition having the same color area as the first color space of the first image by using the look up table.

14. The non-transitory recording medium according to claim 13,
wherein the display image is generated by superposing the second image on the first image.

15. The non-transitory recording medium according to claim 13,
wherein the reproduction device is configured to:
receive second color space information indicating the second color space of the second image, and
convert the second color space of the second image based on the first color space information and the second color space information.

16. The non-transitory recording medium according to claim 13,
wherein the second color space of the second image is based on a format of the second image.

17. An image processing method comprising:
receiving a first image, a second image and first color space information indicating a first color space of the first image;
converting a second color space of the second image to a converted color space same as the first color space, when the second color space is different from the first color space;
generating a display image including the first image and the second image having the converted color space;
generating a look up table that associates a palette entry identifier of a palette corresponding to the second color space of the second image with an image signal of the first color space of the first image, in which the first color space of the first image has a first color area and the second color space of the second image has a second color area different from the first color area, and in which the look up table is generated from a second look up table having correspondence data between a second palette entry identifier corresponding to the second color space and a second image signal in the second color space by performing a color space conversion on the second look up table whereby the look up table has a color area that is different from a color area of the second look up table, the color space conversion on the second look up table comprising, for each of a plurality of second color space values in the second color space, rewriting the second color space value as a first color space value, and associating with the first color space value the second palette entry identifier provided in the second look up table for the second color space value, so as to generate the look up table comprising a plurality of first color space values associated with respective second palette entry identifiers; and
converting a palette entry identifier of the second image directly to an image signal for superposition having the same color area as the first color space of the first image by using the look up table.

18. The image processing method according to claim 17,
wherein the generating of the display image is by superposing the second image on the first image.

19. The image processing method according to claim 17 further comprising:
receiving second color space information indicating the second color space of the second image, and
converting the second color space of the second image based on the first color space information and the second color space information.

20. The image processing method according to claim 17 further comprising:
determining color space of the second image based on a format of the second image.

21. A non-transitory recording medium on which is recorded a program having instructions that, when executed by circuitry, configure the circuitry to:
receive a first image, a second image and first color space information indicating a first color space of the first image;
convert a second color space of the second image to a converted color space same as the first color space, when the second color space is different from the first color space;
generate a display image including the first image and the second image having the converted color space;
generate a look up table that associates a palette entry identifier of a palette corresponding to the second color space of the second image with an image signal of the first color space of the first image, in which the first color space of the first image has a first color area and the second color space of the second image has a second color area different from the first color area, and in which the look up table is generated from a second look up table having correspondence data between a second palette entry identifier corresponding to the second color space and a second image signal in the second color space by performing a color space conversion on the second look up table whereby the look up table has a color area that is different from a color area of the second look up table, the color space conversion on the second look up table comprising, for each of a plurality of second color space values in the second color space, rewriting the second color space value as a first color space value, and associating with the first color space value the second palette entry identifier provided in the second look up table for the second color space value, so as to generate the look up table comprising a plurality of first color space values associated with respective second palette entry identifiers; and
convert a palette entry identifier of the second image directly to an image signal for superposition having the same color area as the first color space of the first image by using the look up table.

22. The non-transitory recording medium according to claim 21,
wherein the display image is generated by superposing the second image on the first image.

23. The non-transitory recording medium according to claim 21, wherein, when the instructions are executed by the circuitry, the circuitry is configured to:
receive second color space information indicating the second color space of the second image, and
convert the second color space of the second image based on the first color space information and the second color space information.

24. The non-transitory recording medium according to claim 21, wherein, when the instructions are executed by the circuitry, the circuitry is configured to:
determine color area of a color space of the second image based on a format of the second image.

* * * * *